US006564108B1

(12) United States Patent
Makar et al.

(10) Patent No.: US 6,564,108 B1
(45) Date of Patent: May 13, 2003

(54) METHOD AND SYSTEM OF AUXILIARY ILLUMINATION FOR ENHANCING A SCENE DURING A MULTIMEDIA PRESENTATION

(75) Inventors: Michael G. Makar, Boca Raton, FL (US); Joseph M. Mosley, Boca Raton, FL (US); Tracy A. Tindall, Plantation, FL (US)

(73) Assignee: The DelFin Project, Inc., Boca Raton, FL (US)

( * ) Notice: Subject to any disclaimer, the term of this patent is extended or adjusted under 35 U.S.C. 154(b) by 485 days.

(21) Appl. No.: 09/588,953

(22) Filed: Jun. 7, 2000

(51) Int. Cl.[7] .............................................. G05B 11/01

(52) U.S. Cl. ............................ 700/17; 700/83; 700/19; 382/254; 382/274; 463/31

(58) Field of Search ............................ 700/17, 18, 19; 345/156; 362/227, 228, 84, 234; 446/27; 463/36, 30–32, 35; 472/133; 382/254, 260, 274; 315/76, 152, 153

(56) References Cited

U.S. PATENT DOCUMENTS

| | | | | |
|---|---|---|---|---|
| 3,806,919 A | | 4/1974 | Comey | 340/366 B |
| 4,440,059 A | | 4/1984 | Hunter | 84/464 R |
| 4,471,385 A | | 9/1984 | Hyatt | 358/230 |
| 4,753,148 A | | 6/1988 | Johnson | 84/464 R |
| 5,113,738 A | | 5/1992 | Krucoff | 84/462 |
| 5,275,082 A | | 1/1994 | Kestner-Clifton et al. | 84/477 B |
| 5,461,188 A | | 10/1995 | Drago et al. | 84/600 |
| 5,519,809 A | | 5/1996 | Husseiny et al. | 395/2.84 |
| 5,668,537 A | * | 9/1997 | Chansky et al. | 340/825.06 |
| 5,784,096 A | | 7/1998 | Paist | 348/32 |
| 5,818,342 A | | 10/1998 | Solomon et al. | 340/815.46 |
| 5,886,304 A | | 3/1999 | Schlenzig et al. | 181/155 |
| 5,896,457 A | | 4/1999 | Tyrrel | 381/56 |
| 5,922,982 A | | 7/1999 | Ishibashi | 84/615 |
| 5,986,201 A | | 11/1999 | Starr et al. | 84/645 |
| 6,020,825 A | | 2/2000 | Chansky et al. | 340/825.06 |
| 6,050,717 A | * | 4/2000 | Kosugi et al. | 364/146 |

FOREIGN PATENT DOCUMENTS

| | | |
|---|---|---|
| EP | 0 786 716 A2 | 7/1997 |
| FR | 2 628 335 | 9/1989 |
| FR | 2 741 229 | 5/1997 |
| WO | WO 95/24796 | 9/1995 |
| WO | WO 99/12119 | 3/1999 |

OTHER PUBLICATIONS

International Search Report dated Oct. 15, 2001 for International Application No. PCT/US01/18431.

"An Overview of MIDI", The MIDI Companion (3 pgs.) (Date Unknown).

* cited by examiner

*Primary Examiner*—Paul P. Gordon
(74) *Attorney, Agent, or Firm*—Jon A. Gibbons; Fleit, Kain, Gibbons, Gutman & Bongini P.L.

(57) ABSTRACT

A method to present auxiliary lighting for enhancing a scene during a multimedia presentation. The method in photonic enclosure comprising the steps of: coupling one or more illumination sources over a network, so that at least one illumination source of the one or more illumination sources is capable of being uniquely addressed; displaying a multimedia presentation; reading a series of preprogrammed illumination identifiers stored in computer readable medium corresponding with the primary multimedia presentation; interpreting one or more illumination identifiers to set one or more illumination sources for a period of time and to set the address of at least one of the one or more illumination sources; and sending a set signal in response to the interpretation of the one more illumination identifiers to one or more illumination sources over the network.

In another embodiment, a gaming helmet is disclosed as the photonic enclosure used to carry out the above method.

In yet another embodiment, a system and computer readable medium is described to carry out the above method.

51 Claims, 17 Drawing Sheets

100

300

FIG. 4B
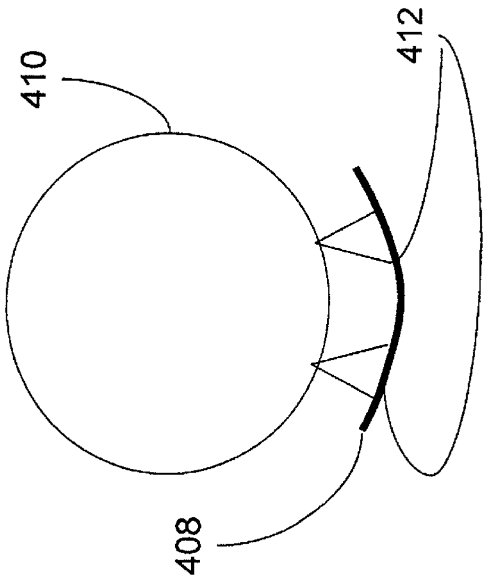
FIG. 4A
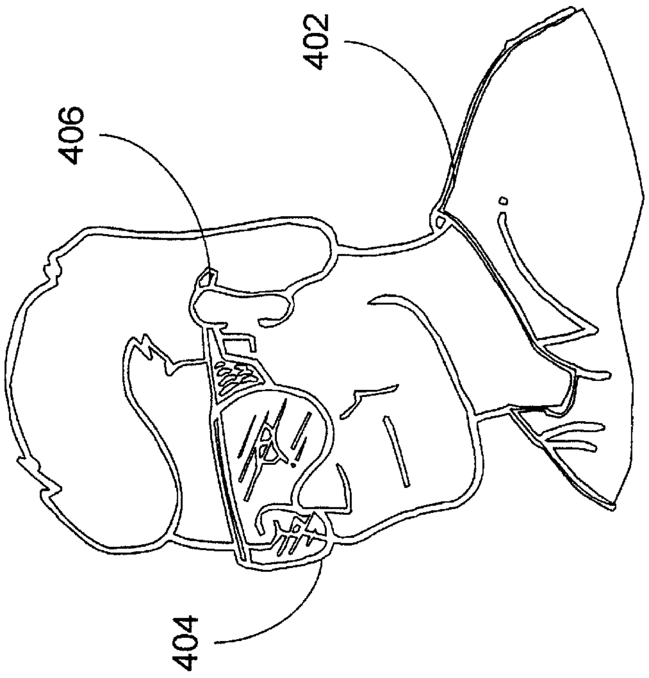
400
FIG. 4

500

700

800

FIG. 10B
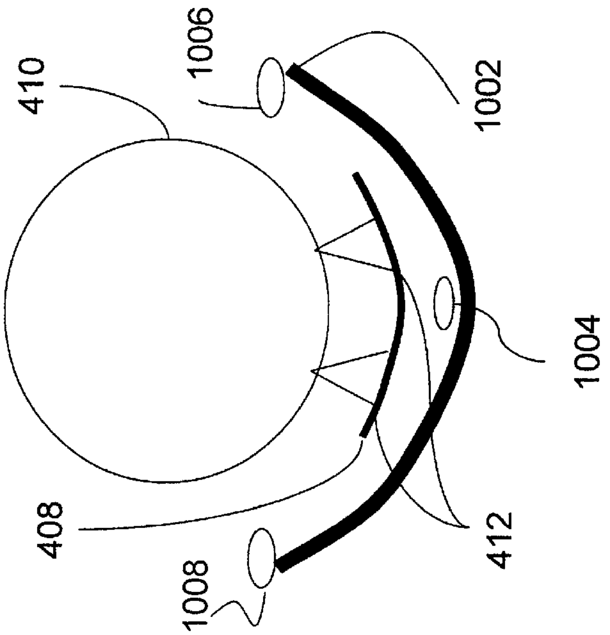
FIG. 10A
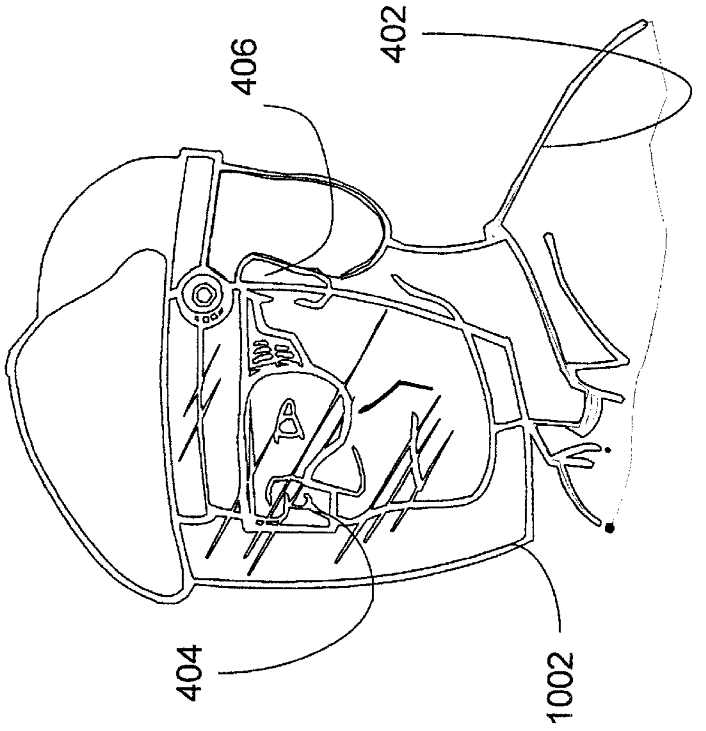
1000
FIG. 10

1100

1400

1500

METHOD AND SYSTEM OF AUXILIARY ILLUMINATION FOR ENHANCING A SCENE DURING A MULTIMEDIA PRESENTATION

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

Not Applicable

FIELD OF THE INVENTION

This invention generally relates to the field of effects lighting and more particularly to the field of illumination sources synchronized to produce visual effects during the presentation of a multimedia presentation.

BACKGROUND OF THE INVENTION

Consumers continue to demand and expect more realistic experiences while viewing multimedia program such as television, movie theaters and computer games. The realism first started with the addition of better color technologies in the 1950's. More recently surround sound systems have beginning to proliferate in the movie theaters initially and more recently in the home market. Home theater advanced forward in the late 1980s when Dolby Laboratories introduced Dolby Surround-the home version of the Dolby Stereo that was first introduced in movie theaters back in 1977 with "Star Wars." The system put two speakers up front and two in the rear in an attempt to recreate the sound of movie theaters. Dolby Surround was supplanted by Dolby Pro Logic, which added a front-center channel to improve the reproduction of dialogue, and steering logic to direct the sounds to the appropriate speakers. Like Dolby Surround, the rear surround channel signal is sent to two speakers. It is, however, a mono signal. Dolby Pro Logic is now found on virtually all midline A/V receivers.

Surround sound provides 3-D (3 dimensional) depth to systems. A perspective view of typical surround sound theater system 100 is shown FIG. 1. The movie is typically projected on the screen 112 in a darken room. The audience faces the screen 112 in the theater seating 114. A total of five speakers are shown, left front speaker 102, right front speaker 104, left rear speaker 106, right rear speaker 108, center speaker 118 and sub-woofer 110. The screen typically has a wide aspect ration of 9 to 16 to improve the visual perception of the scene by the audience. The left front speaker 102 and the right front speaker 104 offer the traditional stereo sound. The left rear speaker 106 and the right rear speaker 108 provide stereophonic rear imaging. The sub-woofer offers frequencies (typically below 120 Hz) that provide the rumbles of an explosion or the deep bass in a musical piece. The sound is what puts us in the middle of the action. Take away the sound, and a movie stops being a total experience. It would be like watching "Jurassic Park" without the hearing the realism of gigantic dinosaur stomps toward you or feeling the power of an alien spacecraft hovering over the White House in "Independence Day."

FIG.2 is the home theater 200 counterpart to the surround sound theater of FIG. 1. It is noted that when a movie that was seen at the movie theater is seen at home, it is not as moving as the theater experience. This is in part because of the aspect ratio. In a theater the screen has a wide aspect ratio 9 to 16, or similar. This same movie when broadcast on TV is 4 to 5, unless a letter box format has been chosen. This squarer video image chops off the left and right margins. The peripheral images are missing. The "important" part if the video is in tact but the peripheral vision input is reduced.

Never the less, the state of the art home theater has the latest surround sound features, which includes speakers in the corners of the TV room. The speakers are labeled left front 202, right front 204, left rear 206 and finally right rear 208. Some surround sound products have sub-woofers 210, and a center channel speaker, 218. The home entertainment equipment providers, such as Sony™, Hitachi™, RCA™ and others provide surround sound using all of the speakers, to simulate real life. An example of a surround sound system available for home theater today is the Dolby Digital™ 5.1 surround technology, which has six independent channels of sound. Digital 5.1 offers five full-frequency, discrete and independent audio channels (front-left 202, front-center 218, front-right 204, right-rear 208 and left rear 206) plus a dedicated low-frequency effects channel that directs bass information to the subwoofer 210. Connected to the TV is an optional digital game unit, 250, such as those available from Sega, Sony and Nintendo.

While home theaters continue to advance to provide the desired realism of the movie theater, home theaters are not without their shortcoming. One shortcoming is ambient light. Unlike the movie theaters of FIG. 1, most home theater rooms have one or more windows 216. These windows allow in light without respect to the TV video being viewed by the TV home seating 214. The ambient outside light through windows 216 often time spoils the home theater realism. For example, if one has a nighttime video on the TV the light from the daytime window spoils the effect. Therefore in a typical TV room it is even more difficult to become engrossed in the total movie experience because of the ambient lighting in the room. Curtains and shades can reduce the ambient lighting interference.

Another shortcoming with home theaters today is the poor aspect ration of home theater TV 212 of 4 to 5. In order to improve the aspect ratio of home theater systems 200, the TV broadcast industry has begun a change from the NTSC PAL or SCAM analog standard to an all-digital HDTV standard. The HDTV standard has the same aspect ratio as movie theaters and will therefore restore the theater experience on HDTV in the home, with respect to the aspect ratio. The home TV will gain back the lost part of the video experience (4 to 5 back to 9 to 16). Never the less, there is a need for encircling visual stimulus in a TV environment in order to better visually engross the viewer with the home theater experience.

But even if the aspect ratio of the TV 212 of the home theater is increased to match the 9 to 16 aspect ratio, the image is still not "real" life. In a typical day one receives visual stimulus from all around one's self. In fact some of the most surprising or frightening things happen just outside the field of view. According there is a need for encircling visual stimulus in a theater in order to have viewers engrossed in the action of multimedia presentations such as movies, games, and television.

Along with the quick advances in home theater systems 200, the PC multimedia equipment also has been advancing. FIG. 3 is a perspective illustration of a typical PC multimedia environment 300. The PC monitor 312 has an aspect ratio of 4 to 5 like TV212. But unlike the TV 212, the PC monitor 312 is setup is for very close viewing, interaction through user input and listening. The user, usually singular, interacts with a keyboard and a pointing device (mouse), where as TV is in general a passive watching experience.

Current PC multimedia equipment has the latest surround sound features. These features included a left front speaker 302, a right front speaker 304, and some advanced PC have optional left rear speakers 306 and right rear speaker 308. Also shown, as an optional feature is the sub-woofers 310. The PC operator in seat 314 sits in front, in such a way that they are at an arm's length to the PC's keyboard 316, and optional pointing device, not shown. All of the visual information comes from the PC monitor, 312. There is usually a room window(s) 318, which allows in light. And as described above in the home theater 200, the ambient room light combined with the small screen aspect ration of monitor 312 often distracts from multimedia PC experience. Accordingly, a need exists to provide users of multimedia PC games a more realistic visual experience to over come these problems.

The game market for both TV "Computer" Game units such as SEGA™, Nintendo™, Sony™ Play Station and the just described multimedia PC of FIG. 3 continues to grow and has in recent years has surpassed the movie entertainment industry in total dollar sales. The avid game player or "gamers" purchase different titles of interactive games and game units 250 or multimedia PC hardware. There is a very large and growing market for "computer" games. The avid "gamer" also has all types of attachments. There are force-feedback joysticks, racing wheels, brake and gas pedals, seats that vibrate, and even guns that interact with the display. Many "gamers" spare no money in attempting to better engross themselves in the realism while playing games. A recent gaming accessory is a sensory gaming chair called the Intensor LX 350 Sensory Gaming Chair from Imeron Inc., of North Carolina that provides a seat that vibrates, bounce, tilt and vibrate to add more realism to video game playing.

More recently, "gamers" and Internet aficionados have turned to head-mounted displays. FIG. 4A illustrates a person 402 wearing head-mounted display. Examples of head-at mounted display are available at online URL (www.i-glasses.com). This looks like a pair of glasses 404 but has very small displays built into the glasses. These glasses have lenses that allow the viewer to perceive an image that looks similar to a large screen TV or computer monitor. In addition the image is always directly in front of the person whichever way they move their head. These glasses typically have earphones 406 that allow for stereo sound. Not shown is the PC or portable game appliance that supplies the image to the user and also allows for it's interaction using, for example user buttons. The glasses are typically built so as to shade ambient light. This allows for the viewer to be totally focused on the image without respect to any ambient light induced distractions. FIG. 4B is an elevational top view of the head-mounted display of FIG. 4A. On the right, circle 410 is an ideal top view of the person with the ideal display rendered as 408. Note that the two displays 412 are seen as one image.

The head mounted system 400 is an excellent platform to further engross viewers of multimedia presentations such as games and movies. The head mounted system 400 limits out side stimulus and provides only the intended audio and visual stimulus. However note that this does not provide for any visuals that are intended but outside the normal image area. Accordingly, a need exists for users of head mounted system 400 with a method and apparatus to improve the visual perception outside the normal image area.

Another area of game playing that has expanded greatly over the past few years is hand-held computer games. FIG. 5 is an illustration 500 of a user 502 playing a hand-held computer game 502. These hand-held units made by for example: SEGA™, Nintendo™, and Sony™ are designed to be self-contained. The player 502 interacts with the hand-held 506 with their hands 504. Note that the display 508 and an optional speaker 510 are integrated into the hand-held unit 506. This permits the hand-held unit 506 to be very portable. This allows the ambient noise and light to effect the users enjoyment, making it very difficult to become completely engrossed in the action. For example, during a game where the PC screen depicts a dark nighttime setting the warm and friendly window allows fresh sunlight to spoil the effect. This is of course not "real" life. But part of these games is the larger then life setting. They look forward to as much simulated reality as possible. Accordingly there is a need for encircling visual stimulus for PC Gamers in order to become visually engrossed while playing the game. Accordingly, a need exists for to provide users of hand-held game units a method and apparatus to improve the realism during the operation of a hand-held game unit 506.

SUMMARY OF THE INVENTION

Briefly, according to the present invention, A method to present auxiliary lighting for enhancing a scene during a multimedia presentation. The method in photonic enclosure comprising the steps of: coupling one or more illumination sources over a network, so that at least one illumination source of the one or more illumination sources is capable of being uniquely addressed; displaying a multimedia presentation; reading a series of preprogrammed illumination identifiers stored in computer readable medium corresponding with the multimedia presentation; interpreting one or more illumination identifiers to set one or more illumination sources for a period of time and to set the address of at least one of the one or more illumination sources; and sending a set signal in response to the interpretation of the one more illumination identifiers to one or more illumination sources over the network.

In another embodiment, a gaming helmet is disclosed as the photonic enclosure used to carry out the above method.

In another embodiment, a hand-held gaming units is disclosed with illumination sources to carry out the above method.

In yet another embodiment, a system and computer readable medium is described to carry out the above method.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 4A illustrates a person wearing head-mounted display.

FIG. 4B is an elevational top view of the head-mounted display of FIG. 4A.

FIG. 10A is an illustration of the person wearing head-mounted display of FIG. 4A with illumination sources, according to the present invention.

FIG. 10B is an elevational top view of the head-mounted display of FIG. 4B with illumination sources, according to the present invention.

DETAILED DESCRIPTION OF AN EMBODIMENT

Figure 1:
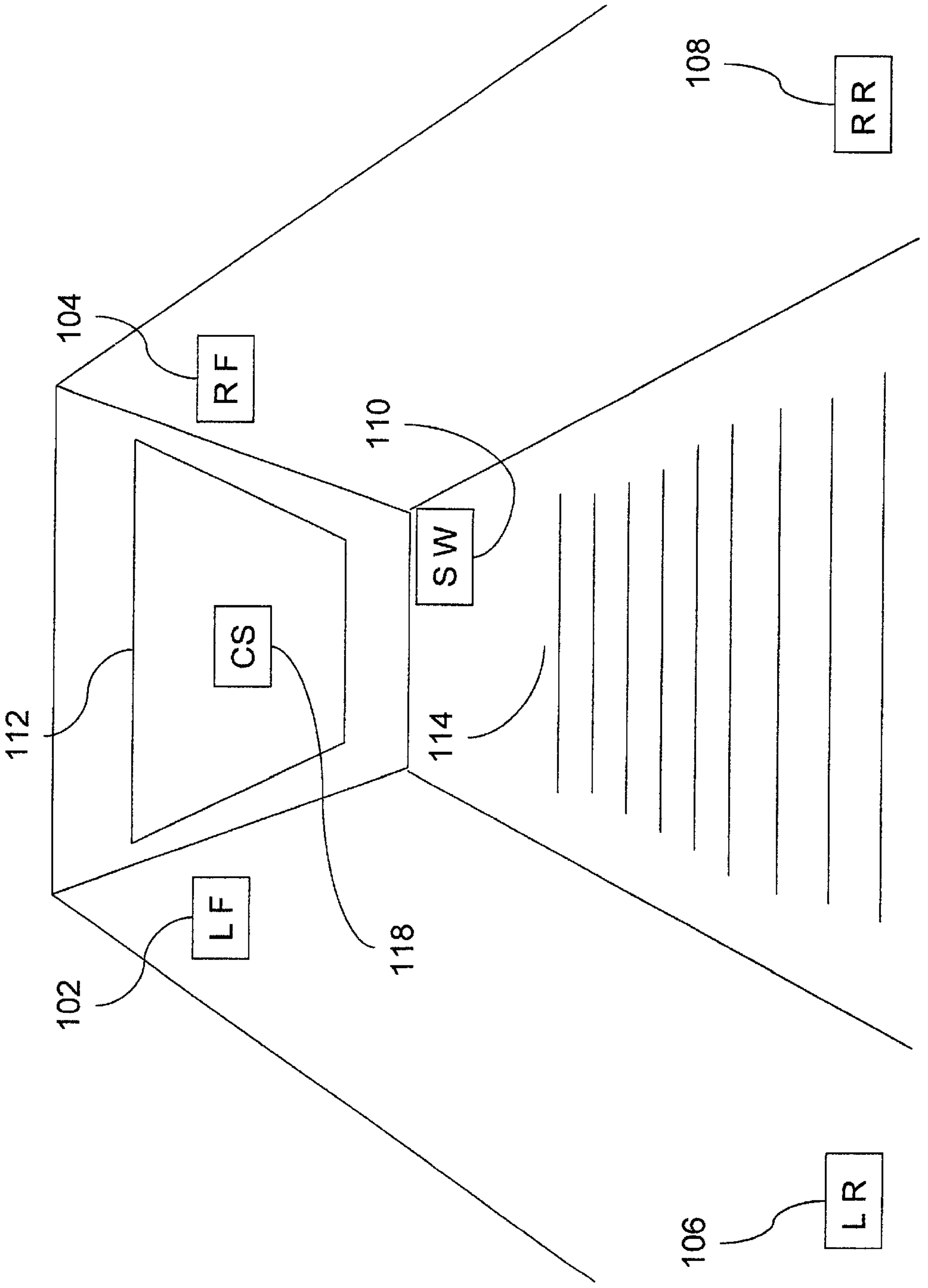
FIG. 1 is a perspective view of typical movie theater system.

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Glossary of Terms Used in this Disclosure

Illumination source—is any device that produces a light including an incandescent lamp, neon, florescent, LED (light emitting diode), sodium, mercury, Xeon, LASAR or in a chemical light source such as a glow stick. The illumination source may respond to a simple on/off command, such as a household light switch. And in another embodiment, the illumination source may respond to a more complicated command such as an intensity level or with a defined profile. For example, a neon illumination source may commanded to be on for ½ second at full brightness. The illumination source may be seen directly, or reflected, or viewed through fixed or changeable filters and or diffuser. The changeable filter or bulb selection may provide one or more colors to the light. The light source may be a singular light source or two or more distinct light sources, such as those placed in a Pipe lighting. The illumination source may be combined with other hardware such as speakers into a unit such as a lighting unit.

MIDI (Musical Instrument Digital Interface) is a protocol designed for recording and playing back music on digital synthesizers that is supported by many makes of personal computer sound cards. Originally intended to control one keyboard from another, it was quickly adopted for the personal computer. Rather than representing musical sound directly, it transmits information about how music is produced. The command set includes note-ons, note-offs, key velocity, pitch bend and other methods of controlling a synthesizer. The sound waves produced are those already stored in a wavetable in the receiving instrument or sound card. Since a MIDI file only represents player information, it is far more concise than formats that the sound directly. MIDI permits very small file size. Each lighting source may be assigned a particular instrument from the MIDI standard. In the preferred embodiment, the instrument used an illumination identifier is an instrument not being used by the primary multimedia presentation.

Network—a wired or wireless connection coupling one or more illumination sources where at least one of the illumination sources is addressable. The address may be wired or wireless. Networks include X-10 bus, CE Bus, MIDI bus, RS422 bus, BitBus™, Universal Serial Bus, parallel bus, serial bus, Ethernet, and IEEE 488.

Night vision—also know as scotopic vision. Which is vision that is due to the activity of the rods, as opposed to the cones, of the retina for very low illumination conditions where only the difference of brightness but not of hue or color can be discerned.

Photonic enclosure—a simulated wide-angle viewing environment. A photonic enclosure may used in a movie theater, a TV, a gaming or various PC environments. The presentation of light and its particular color, intensity, duration and exact location are manifested with no limitation.

Pipe lighting—an illumination source in a clear tube.

In the exemplary embodiments described below, each of the illumination sources are depicted as a simple incandescent bulb, however other illumination sources are within the true scope and spirit of the present invention and the scope the present invention is not limited to a single bulb.

Exemplary Illumination Sources in a Movie Theater Embodiment

Figure 6:
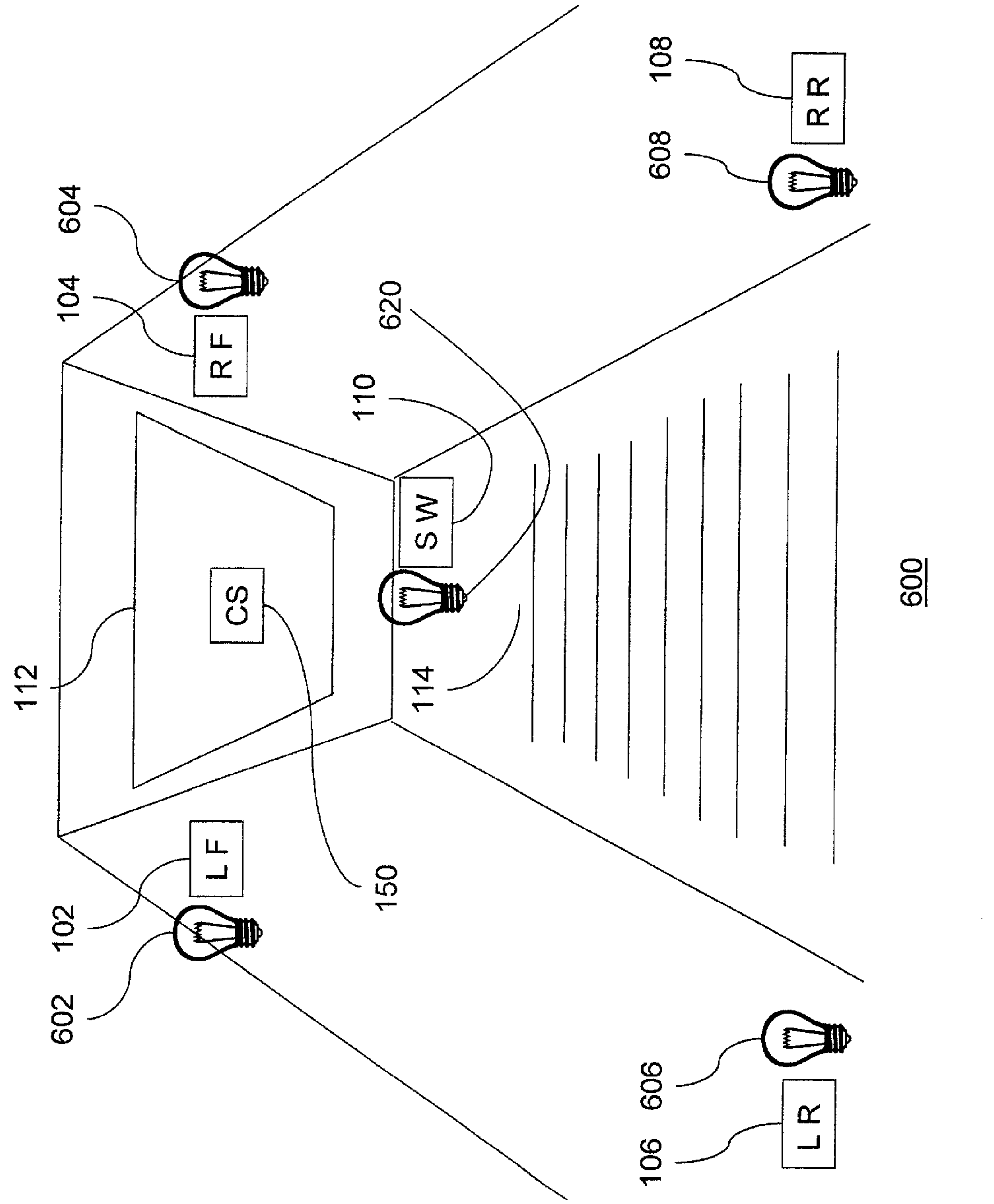
FIG. 6 is an illustration of the movie theater of FIG. 1 with illumination sources, according to the present invention.

Turning now to FIG. 6 shown is the movie theater setting 600 of FIG. 1 with illumination sources according to the present invention. Shown are five illumination sources, left front 602, right front 604, left rear 606, right rear 608, and center channel light 620. These illumination sources are shown in close proximity to the surround sound speakers in this embodiment, but it should be understood that in other embodiments, the illumination sources can be placed at different locations within the movie theater 600. The lights are controlled to project a wide-angle illumination experience while watching the movie on screen 112. These lights would be normally off and turned on only to give a feeling of light outside the normal field of view. The control of the lights are described further below.

In one embodiment, the lights are synchronized to the action of the screen. For example an explosion happens from behind, the rear lights 606 and 608 are strobed to flash in time with the explosion. Note that there need not be any relationship between the intensity of this light, or it's color and the on going audio stream.

The present invention's center illumination unit 620 could be directly seen when it is turned on. Note that unlike the actual movie that is typically reflected off of the screen the center light can show light directly. Therefore the light can be more intense. The viewers in theater seating 114 can be shown directly a strobe flash to help the illusion of an explosion. This light can also be used for what may be described as mood lighting. One example is a continuous soft blue glow simulation of being under water. This is caused by the center light shining up at the ceiling of the theater and not into the eyes of the viewers. In fact much care must be given not to "blind" the viewers. There also may be an audio sub-woofer 110. The present invention provides a surround lighting effect to augment the surround sound and to further engross the viewers in the movie or other multimedia presentation.

The dynamic range of this new photonic enclosure is much better than the current lighting in a theater. For example the display of a blinding flash of an explosion all the way down to a very dark lit night seen. This light can also be in different colors. Further the persistence of the light is brought into play. Once the eye is accustom to very little light the eye views only shades of gray. This is called night vision and one can be blinded temporally by a bright light or flash. This effect can be used as part of a story line.

The spatial range of the viewer now extends off the screen all the way around the viewer. As an example, for a special effect during, a night scene is interrupted by a bright explosion of light that may be behind the viewer. Note that with the sound and the flash of the explosion in the back, and the movie is in the front the audience has the perception that it is "in" the movie and thereby become further engrossed in the movie.

The layout and positioning of the illumination sources in the movie theater 600 must be carefully chosen so as not to harm a viewer's eyesight especially with the use of lasers, or illumination source that have harmful effects because of the frequency of flashes.

Exemplary Illumination Sources in a Home Theater Environment

Figure 2:
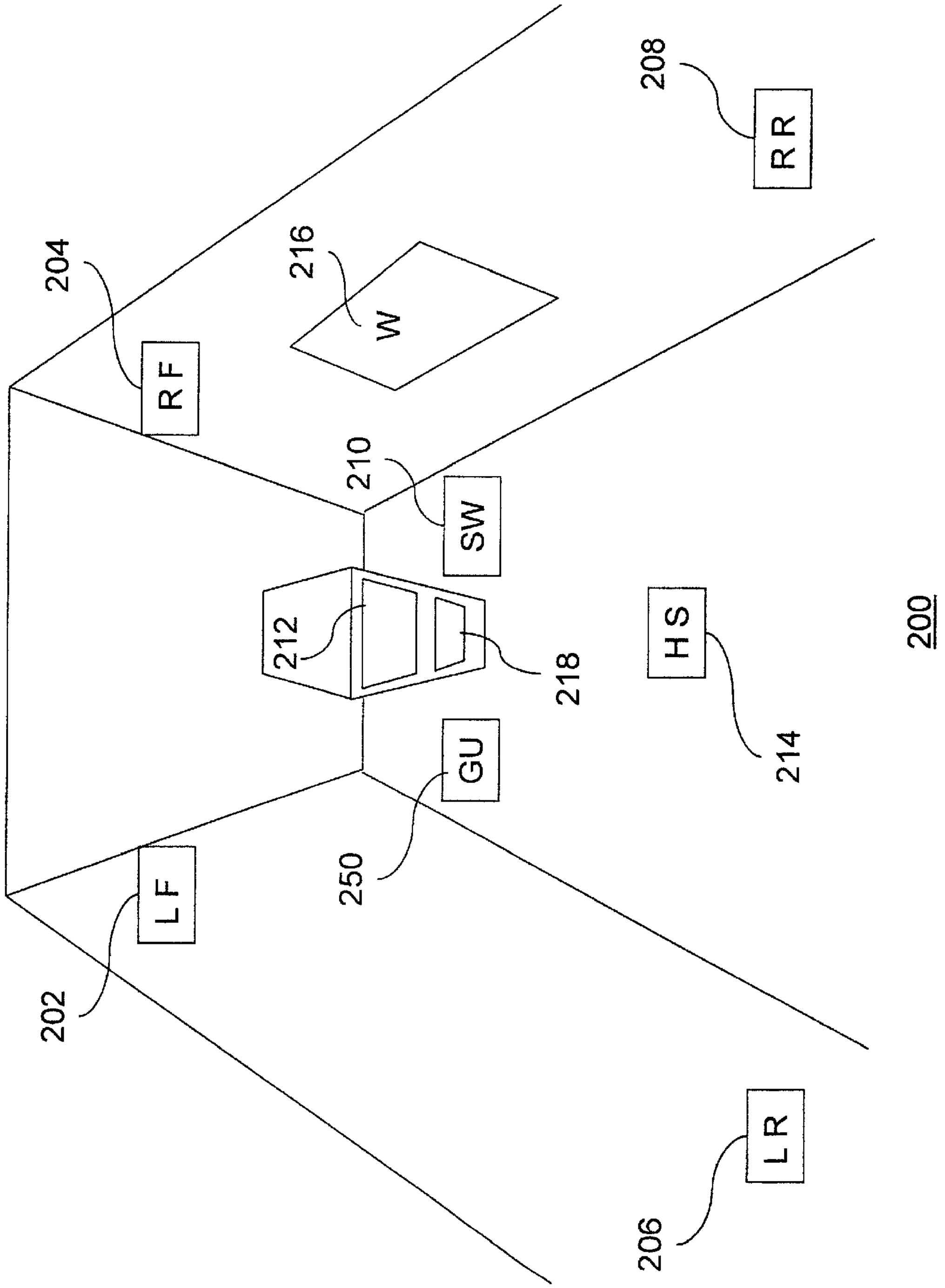
FIG. 2 is the home theater counterpart to the movie theater of FIG. 1.
Figure 7:
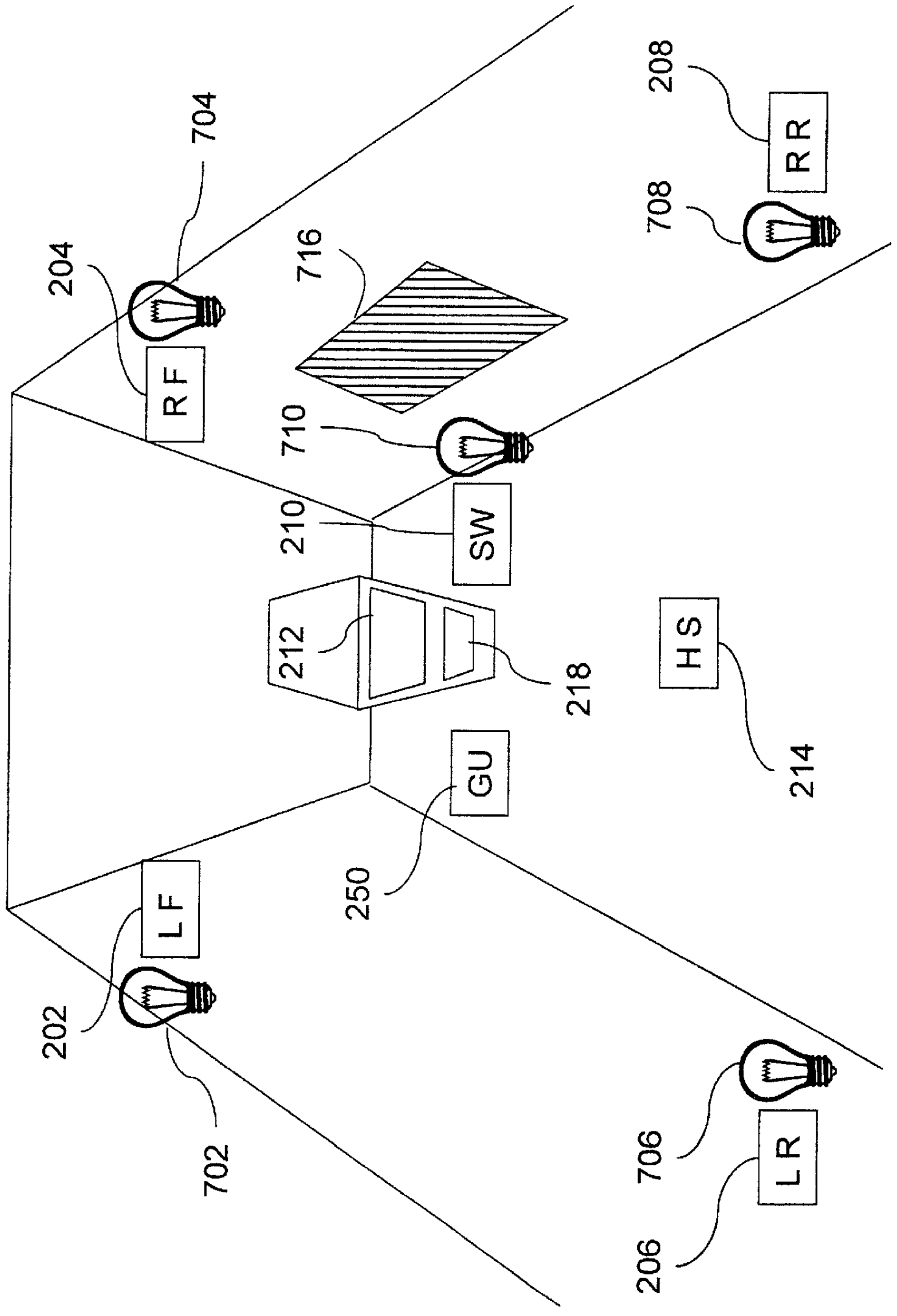
FIG. 7 is an illustration of the home theater of FIG. 2 with illumination sources, according to the present invention.

FIG. 7 shows a home theater 700 of FIG. 2 with illumination sources according to the present invention. As in the movie theater 600 the illumination sources have been placed next to the speakers of FIG. 2. Again this is only one possible arrangement. Shown is a left front illumination source 702, a right front illumination source 704, a left rear illumination source 706 and a right rear illumination source 708, a center illumination source 710. In this embodiment the window 216 is shown with a curtain 716 so as to assure a darkened room and the surround sound speakers have illumination sources next to each speaker cabinet. The center illumination unit 710 is used for "mood" lighting by shining a particular color onto the ceiling, and or for effects such as explosions, or gunfire using a strobe. The TV viewing screen 212 now has a total surround viewing experience for the home viewer while in the home seating, 214.

In a home theater environment 700, it is also noted that not all of the illumination sources or lighting units are necessary. The center channel illumination source 710 may be the only light needed. This would provide the mood lighting and strobe light with minimal installation cost or difficulty.

Exemplary Central Channel Illumination Source with Speaker

Figure 8:
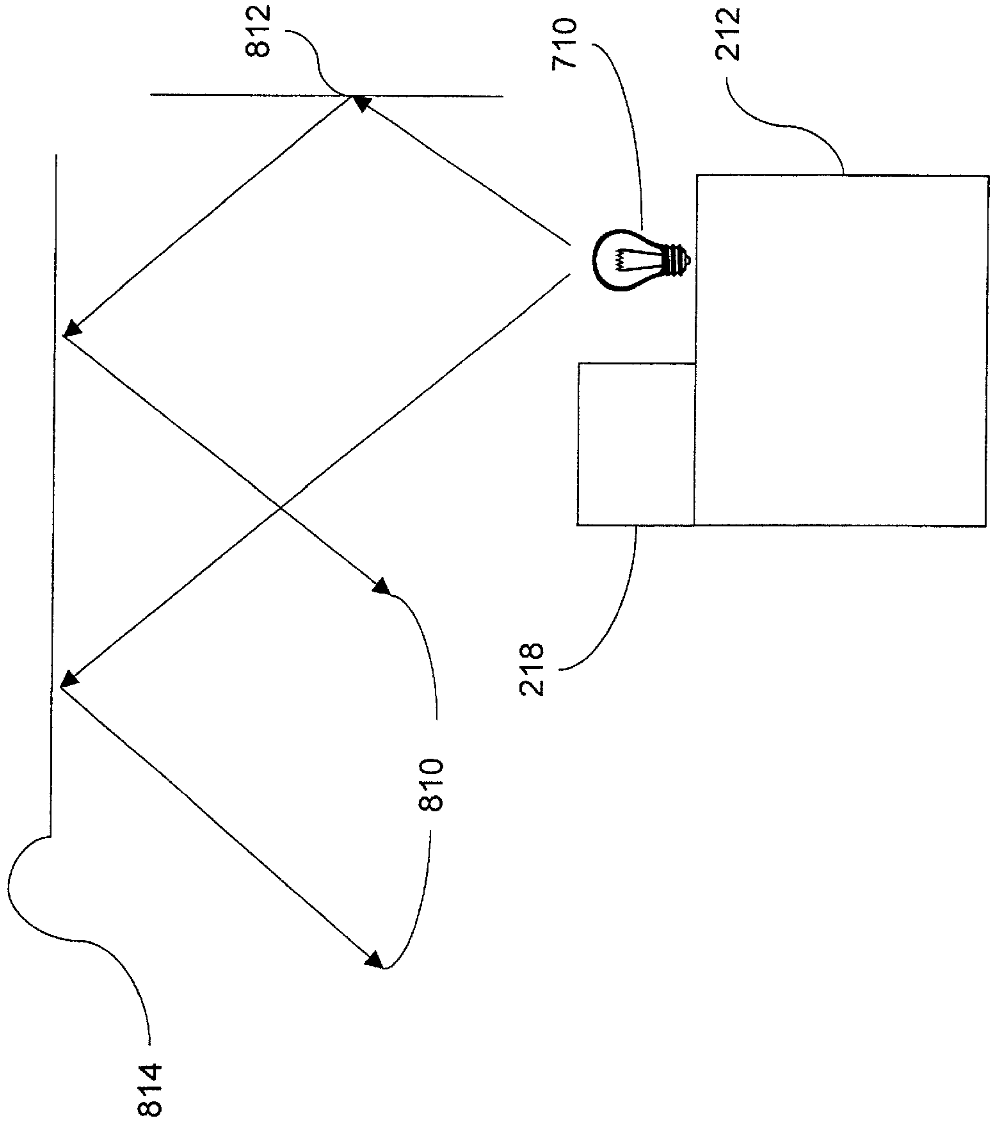
FIG. 8 is an illustration of an exemplary central illumination source placement with respect to a television and speaker so as to project a mood in a room, according to the present invention.

FIG. 8 is a side view 800 of the Central Illumination Source 710. In this embodiment, the central illumination source 710 is behind the central speaker 218 mounted on top of the television 212. The mood or flashing from the center illumination source 710 reflects of the ceiling 814 and walls 812 are shown by simple ray traces 810 to project the mood of the multimedia presentation on the television 212. For example, the blue for under water, red for a fire, the strobe for explosions or gunfire, and other scenes are contemplated.

Exemplary Illumination Sources for PC Multimedia Environment

Figure 3:
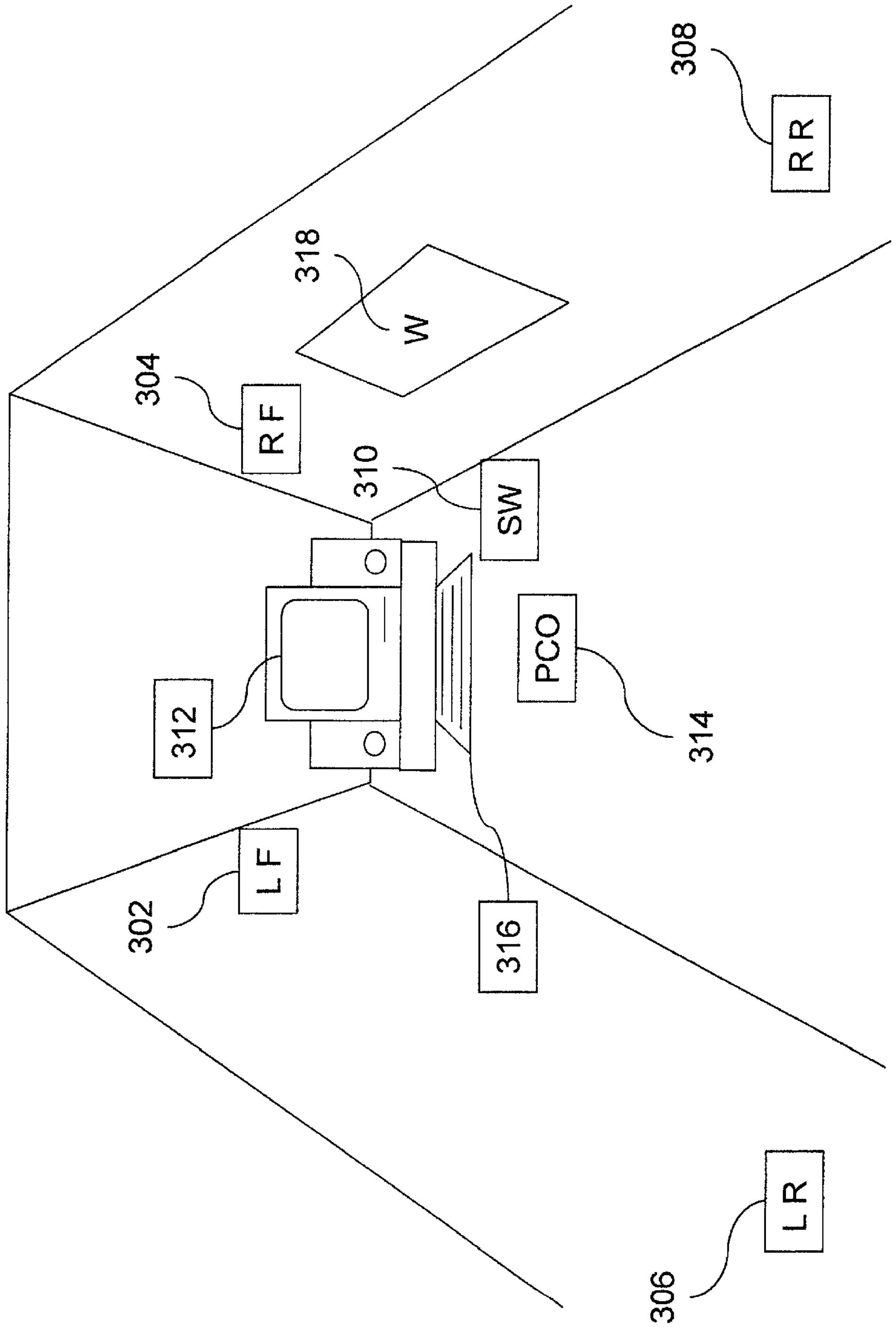
FIG. 3 is a perspective illustration of a typical PC multimedia environment.
Figure 9:
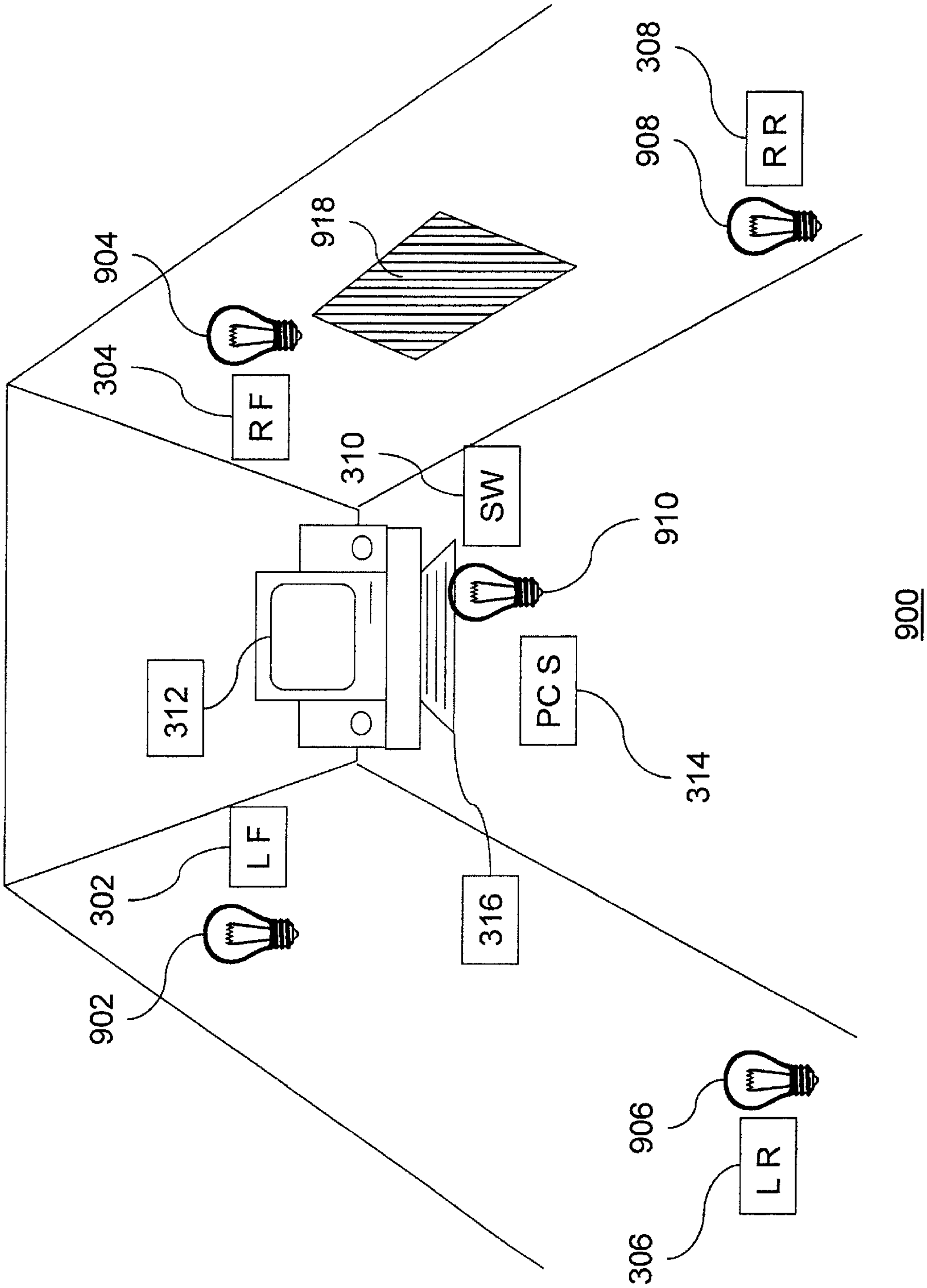
FIG. 9 is an illustration of the typical PC multimedia environment of FIG. 3 with illumination sources, according to the present invention.
Figure 11:
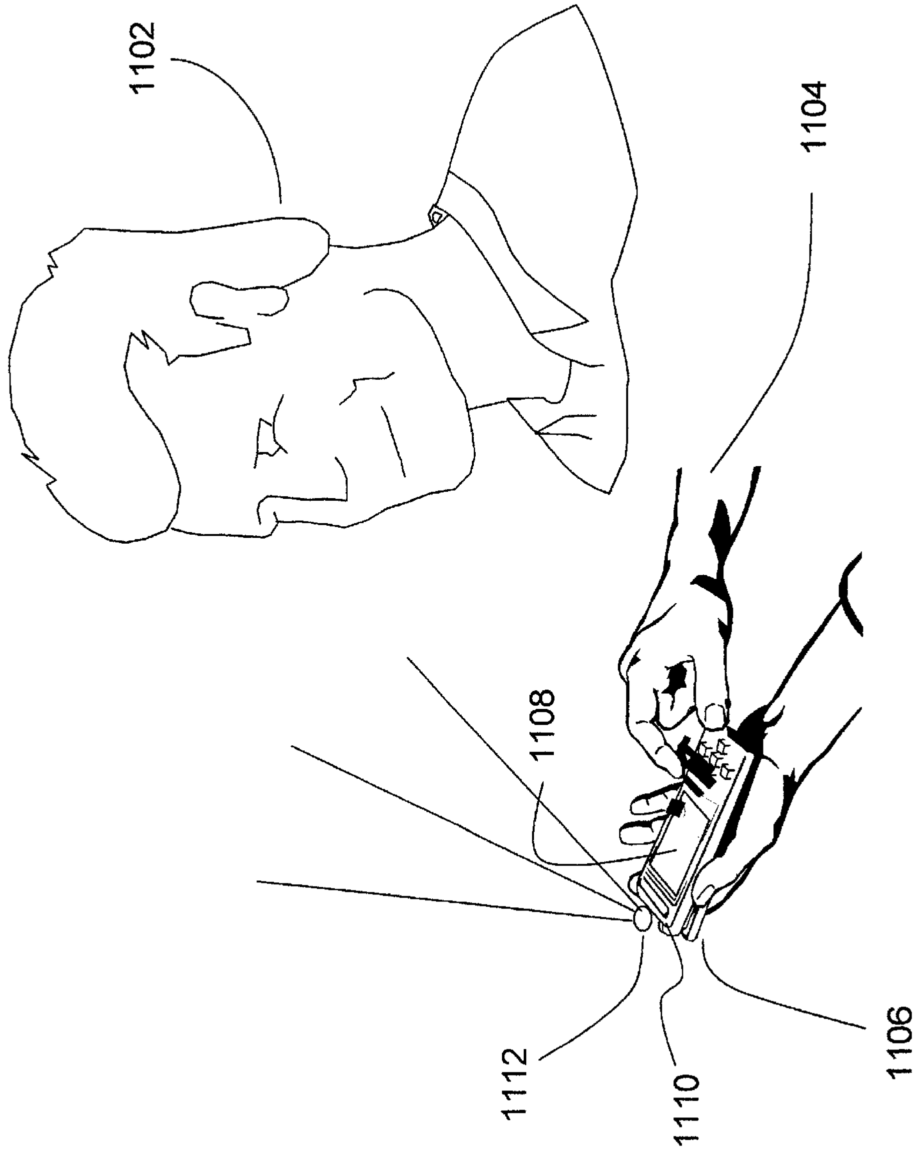
FIG. 11 is an illustration of a user playing a hand-held computer game of FIG. 5 with illumination sources, according to the present invention.

FIG. 9 is an illustration of the typical PC multimedia environment of FIG. 3 with illumination sources according to the present invention. As with the home TV Theater the present invention works best if no un-controlled light is allowed into the room. Therefore the window has its curtain drawn 918. In this embodiment, the illumination sources are placed next to the speakers. There are five illumination sources, left front 902, right front, 904, left rear 906, right rear 908 and center lighting unit 910. The sub-woofer and center lighting unit 910 are shown directly in front and below the PC's monitor 312. It is noted that the Sub-Woofer and center lighting unit 910, may be located together or independently. As with the home TV Theater care must be given not to harm the viewer's vision with this lighting.

The use of other type of gaming devices such force feedback joysticks, steering wheels, gas and brake petals, vibrating seats, and game guns are enhanced with the illumination sources. The overall experience to the "gamer" has been improved with the use of the illumination sources triggered to the multimedia presentation as is described below.

Exemplary Illumination Sources for Head-Mounted Unit

FIG. 10A is an illustration of the person wearing head-mounted display of FIG. 4A with illumination sources according to the present invention. As described above in FIG. 4A, illustrated in FIG. 10A is a viewer 402 wearing head-mounted display. Example manufacturers of head mounted displays are available at online URL (www.i-glasses.com), or from the following companies, Albatche, Inc., Daeyang E&C, I_O Display Systems, LLC, Interactive Imaging Systems, Inc., Kaiser Electro-Optics, Inc., MicroOptical Corp., n-Vision, Inc., OpTech, Seattle Sight Systems, Inc., and Virtual Research Systems Inc.. This looks like a pair of glasses 404 but has very small displays built into the glasses. These glasses have lenses that allow the viewer to perceive an image that looks similar to a large screen TV or computer monitor. In addition the image is always directly in front of the person whichever way they move their head. These glasses typically have earphones 406 that allow for stereo sound. Not shown is the PC or portable game appliance that supplies the image to the user and also allows for its interaction using, for example user buttons. An optional light shield 1002 is shown over the to shade ambient light. This allows for the viewer to be totally focused on the image of the multimedia presentation without respect to any ambient light induced distractions. FIG. 10B is an elevational top view of the head-mounted display of FIG. 4B with illumination sources according to the present invention. On the right, circle 410 is an ideal top view of the person with the ideal display rendered as 408. Note that the two displays 412 are seen as one image. Three illumination sources 1004, 1006 and 1008 are connected inside the head mounted unit 1000. It is important to note that the placement of the illumination sources 1004, 1006 and 1008 be outside the direct view the person, so that when the illumination source is illuminated the person of the head mounted unit is able to visually perceive the illumination of the three illumination sources 1004, 1006, and 1008 while viewing the multimedia presentation.

The light shield 1002 besides reducing the amount of ambient outside light from being seen by the viewer 402, it also enables the viewer to see lighting effects that are out side the viewer's normal viewing field using the illumination sources 1004, 1006 and 1008. The illumination sources have intensity and in one embodiment color shading to project modes during a scene. One effect is a flash during an explosion. Another example is a soft blue background light to simulate being under water. Note the one or more lights, 1004, 1006 and 1008 that are placed just out of vision on the left, right and top of the viewer. These are used to help simulate light based events that are just out of site on the left, right or in back of the viewer such as an explosion or lighting from a thunder storm.

In another embodiment, the head-mounted display 404 is not part of the head mounted unit 1000. The viewer 402 views a PC screen 312 or hand-held game display 508 through the head mounted unit 1000. The light shield in this embodiment is eliminated to permit the direct viewing of the multimedia presentation on screen 312 or hand-held game display 508. The illumination sources 1004, 1006 and 1008 again provide the surrounding illumination effects to the viewer 402 while watching the multimedia presentation outside the head mounted unit.

Exemplary Illumination Sources for Hand-held Games

Figure 5:
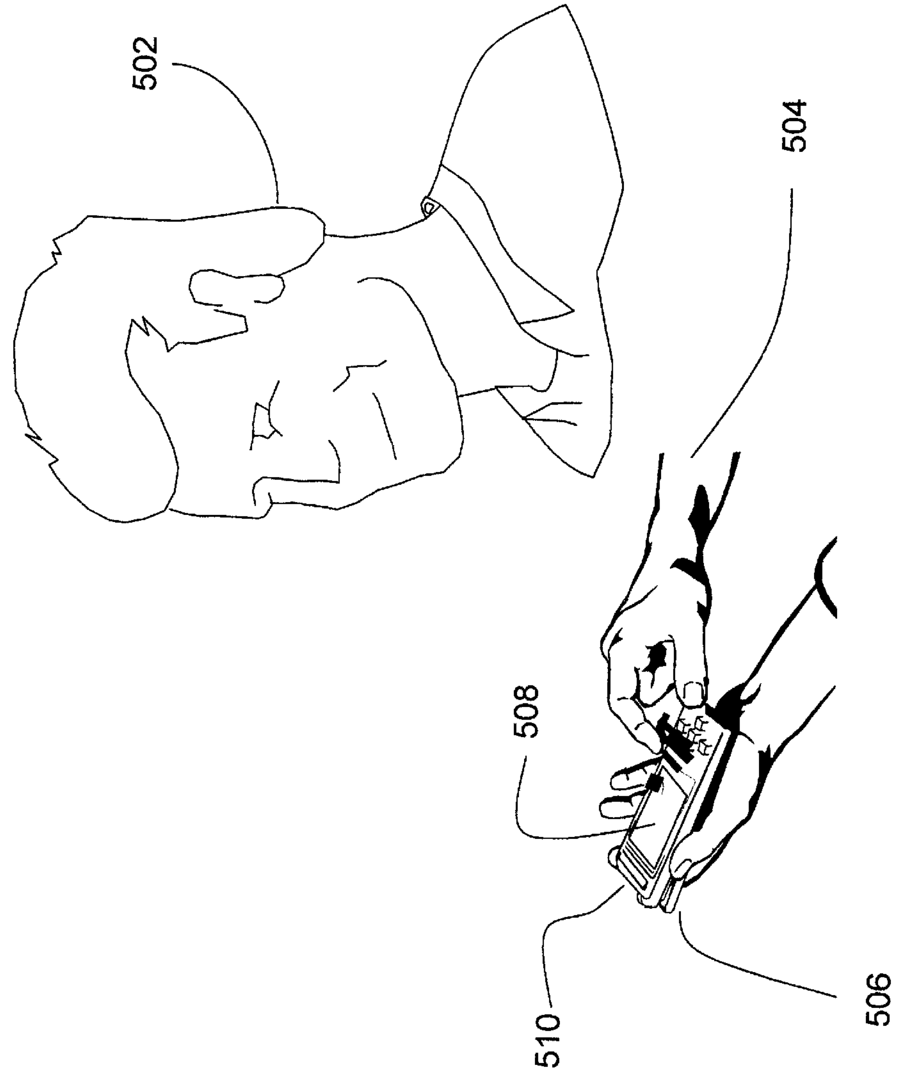
FIG. 5 is an illustration of a user playing a hand-held computer game.

The hand-held computer game 1100 of FIG. 5 is now in the hands 1104 of the viewer 1102. This hand-held 1106, is designed with the subject invention lighting 1112. Like the handheld of FIG. 5, the display 1108 and an optional speaker 1110 are integrated into the hand-held unit 1106. This permits the hand-held unit 1106 to be very portable. Note that only one light 1112 is illustrated, and is built into the top of the unit. This light can simulate muzzle flashes, explosions, or similar. The unit can also have lights built into the left and right side which would lighting effects that indicate actions to the left or right of the hand-held. These are not shown. In another solution the lights are built into glasses that are wom by the hand-held user and flash around the user at the correct time and direction or in the head mounted unit of FIG. 10.

Exemplary Block Diagram of a Digital Communication Bus for Illumination

Figure 12:
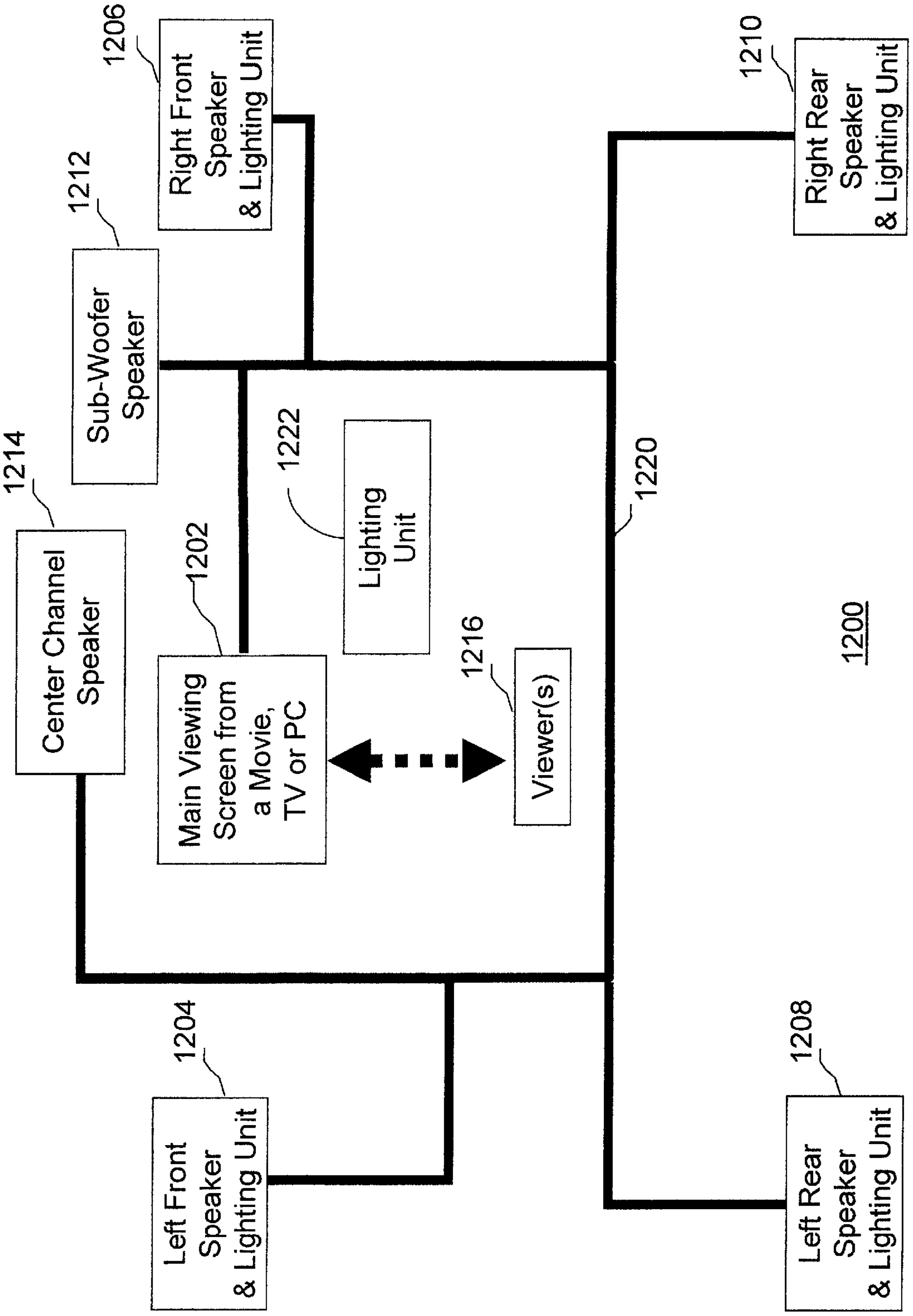
FIG. 12 is a block diagram of a digital network, with one or more illumination sources that are capable of being uniquely addressed, according to the present invention.

FIG. 12 is a block diagram 1200 of a digital network, with one or more illumination sources that are capable of being uniquely addressed, according to the present invention. Shown is digital serial bus implementation. Other bus implementations such as X-10, CE bus, MIDI bus, RS422 bus, BitBus™, Universal Serial Bus, parallel bus, serial bus, Ethernet, and IEEE 488 are possible. The X-10 bus allows for signals being deployed over existing AC power wiring which would not require any new wiring. In an alternative embodiment a wireless solution can be used. It is important to note that the term "uniquely addressed" as used above includes a direct single analog connection to single light bulb or illumination source.

The main viewing screen for a movie or TV or PC is reflected or projected through a viewing screen, 1202. This is controlled by the video stream or by a controller or microprocessor (not shown). The rendering of the images is accompanied by the audio being reproduced by the speakers, 1204, 1206, 1208, and 1210 that are deployed around the viewer(s) 1216. The digital bus 1220, allows for digital information to be sent for controlling the lighting units. This solution provides that all of the speakers and lights are connected to this bus 1220. The left front speaker and lighting unit 1204 produces the correct audio and light so as to simulate an audiovisual source off to the left of the screen. The right front speaker and lighting unit 1206, the left rear speaker and lighting unit 1208 and finally the right rear speaker and lighting unit 1210 all work in the same way from their respective locations. In this fully deployed example, the sub-woofer speaker 1212 is controlled so as to simulate effects that are felt. There is a center lighting unit 1222, which is used for mood and or center of view flashes. Finally the center channel speaker 1214 controls normal surround sound audio for the user. Note that other solutions are possible that do not include all of the sited locations or functions.

Exemplary Block Diagram of an Analog Communication Bus for Illumination

Figure 13:
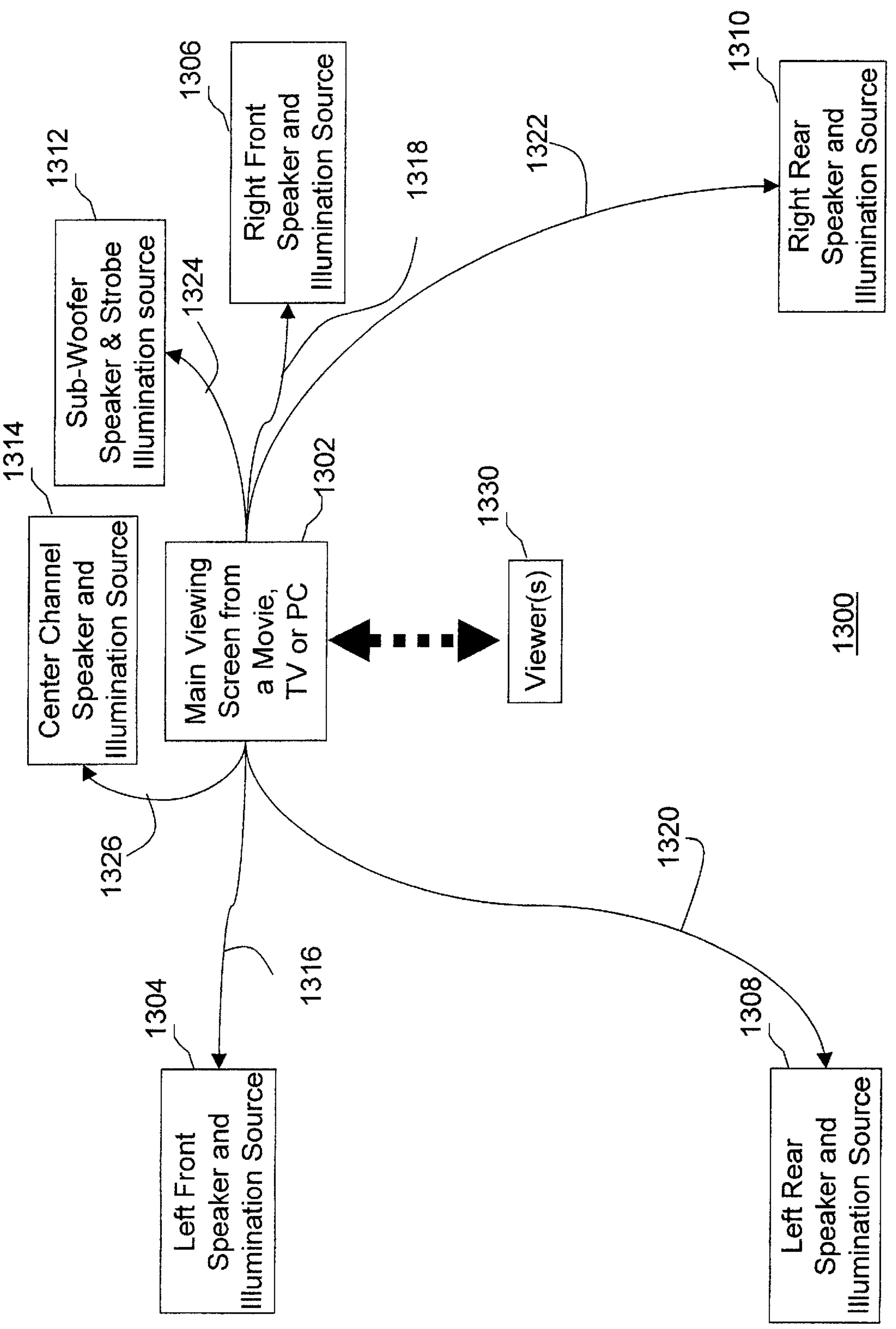
FIG. 13 is a block diagram of an analog network, with one or more illumination sources that are capable of being uniquely addressed, according to the present invention.

FIG. 13 is a block diagram 1300 of an analog network, with one or more illumination sources that are capable of being uniquely controlled or addressed, according to the present invention. Shown are analog separate speaker wire implementation. The direct wired surround sound system, the present invention is implemented using these existing wires. Note that each speaker, 1304, 1306, 1308, 1310 1312 and 1314 have an illumination source that is associated with the particular location. Specifically the main viewing screen 1302 is controlled from a home theater TV for movies or a PC for PC based games for the viewer(s) 1330. In this analog network embodiment, analog network 1300 embodiment, there are six "speaker" wires 1316, 1318, 1320, 1322, 1324, and 1326 to connected to speakers 1304, 1306, 1308, 1310, 1312 and 1314. The present Invention use these wires 1316, 1318, 1320, 1322, 1324, and 1326 to also control the lighting to the respective locations. The left front speaker and illumination source 1304 are connected to the speaker wire 1316. The right front speaker and illumination source 1306, the left rear speaker and illumination source 1308 and finally the right rear speaker and illumination source 1310 all work in the same way from their respective locations. In this fully deployed surround sound example the sub-woofer speaker and strobe illumination source 1312 are controlled so as to simulate effects that are both aurally or acoustically felt and through illumination, that are beyond the normal capabilities of normal speakers and lighting. Finally, the center channel speaker and illumination source 1314 provides normal audio and may act as mood lighting for the viewer. The technique for controlling a light with a digital or analog signal and sending the audio analog signal is described in FIG. 14 below. It is also noted that alternatively the subject invention can be implemented using additional direct connect wires. Yet another solution provides for a wireless solution. It is important to note, that the embodiments above provide total separation between the lighting and the audio in either the connections and/or the physical placements of the speakers and the illumination sources.

Figure 14:
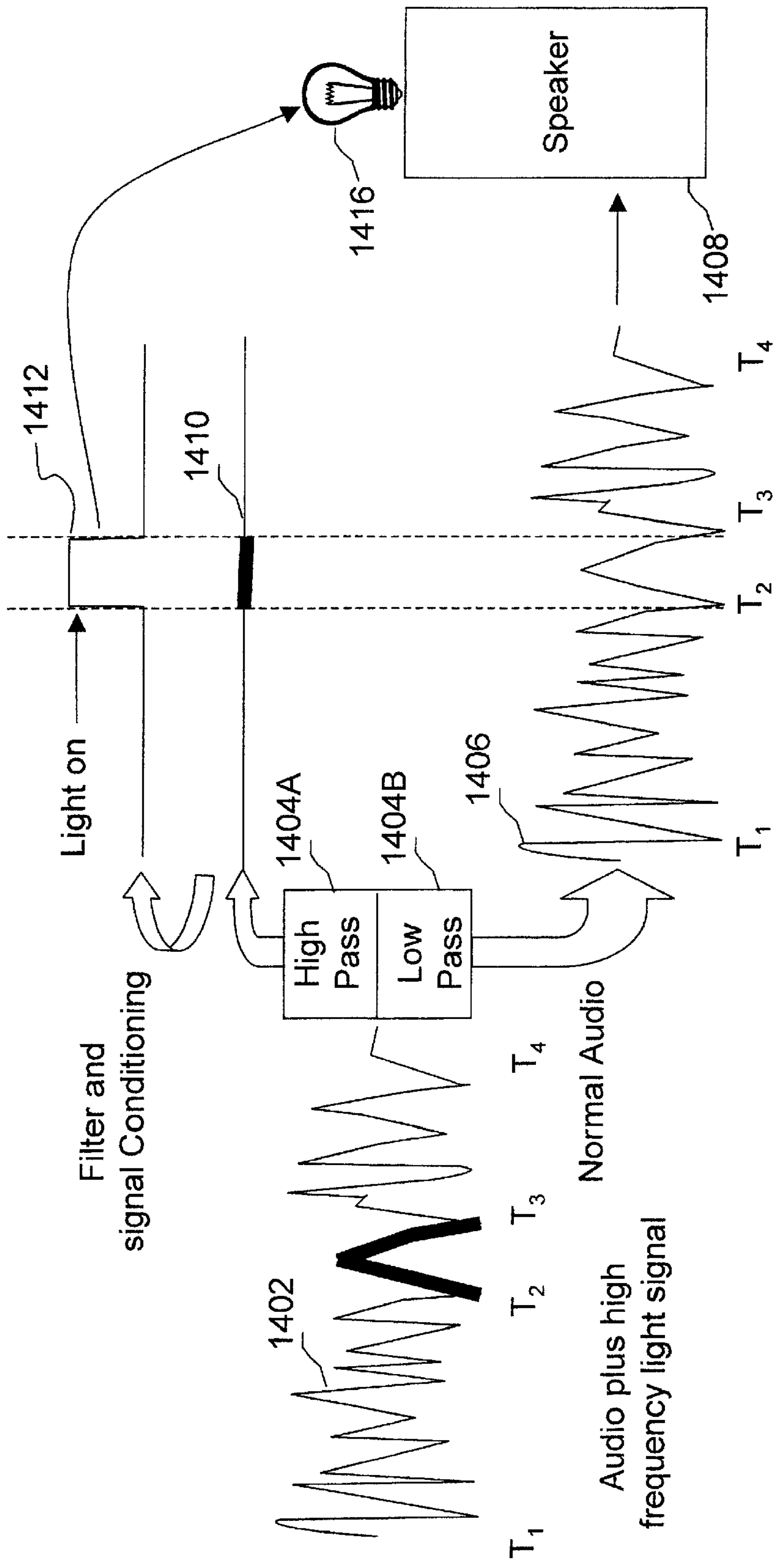
FIG. 14 is a filter for separating an analog audio stream from the pre-programmed illumination identifiers, according to the present invention.

Exemplary Diagram of Filtering an Audio Signal for a Particular Frequency Trigger FIG. 14 is a filter for separating an analog audio stream from the pre-programmed illumination identifiers, according to the present invention. The art of coupling a control signal on to another signal is well understood. Using one wire pair for both the illumination identifiers (or illumination triggers) and the audio signal enables only one cable to be used as in FIG. 13. The audio signal 1402 contains the electronic signal that is presented to the speaker 1408 for the desired audio affect based on the time line. Referring to the time between T1 and T2 the audio signal consists of only audio. The filter 1404 has a high pass section 1404A and low pass 1404B section. The low pass section 1404B passes the frequencies up to 20 Khz to the speaker. The high pass section 1404B passes on the high frequency illumination identifiers. During this exemplary time period between T1 and T2 there are no illumination high frequency signals present, so the entire signal 1406 is presented to the speaker 1408.

At time between T2 and T3 a high frequency signal has been added to the audio signal 1402. Note that this frequency is too high for the speaker to reproduce, in addition it is outside the audio range of a human 20 Hz to 20 KHz. And when this signal is presented to the filter 1404 the high frequency signal 1410 is removed from the normal audio 1406. The speaker plays the normal audio during this time because the high frequency illumination identifier has been removed. This high frequency illumination identifier signal 1410 is then used to create a light on signal 1412. This is presented to the light 1416, which is turned on during the times T2 to T3.

At the time between T3 and T4 the input signal 1402 contains only audio. Accordingly at this time the light 1416 goes out and the audio signal as filtered 1406 is unchanged and presented to the speaker 1408.

The result is that through out the time T1, T2, T3, and T4 the speaker is rendering the normal audio. However in between times T2 and T3 the light flashes on.

It is also noted that the illumination identifier on signal 1410 that was separated from the input audio signal 1402 may contain additional digital information such as MIDI.

In another embodiment, the high frequency signal may be correlated with a video stream so that the signature in a video of a bright gun flash (not shown) combined with the audio signature of the audio signal 1402, provides triggering of illumination sources.

In still another embodiment, the high frequency signal may be replaced by a correlation for triggers contained in a NTSC, PAL, MPEG or similar video signal, where the triggering signals are part of a secondary channel such as close caption or language two. The triggering in this embodiment is off of key words "gun shot", "explosion", "campfire", "underwater" and more.

Exemplary Sound Signature Triggering a Lighting Effect

Figure 15:
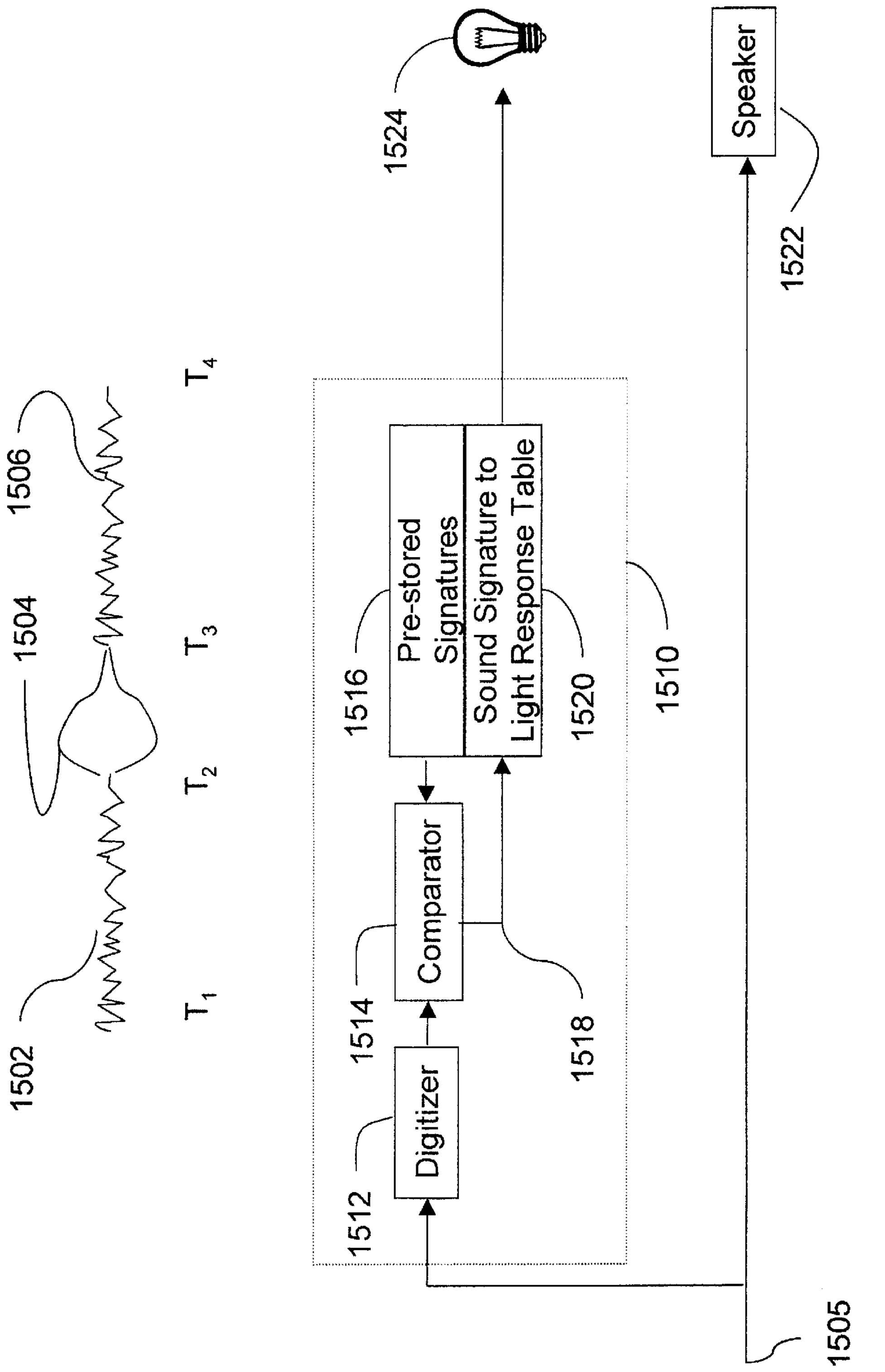
FIG. 15 is signal processor filter for triggering illumination sources from multimedia streams without preprogrammed illumination identifiers, according to the present invention.

Turning now to FIG. 15 is signal processor for triggering illumination sources from multimedia streams without pre-programmed illumination identifiers, according to the present invention. There is an audio signal 1502 that is normal, between T1 and T2 (1504). This signal is presented to both the speaker 1522 and a signal processor 1510 over input 1508. It is important to note that the processor 1510 can be implemented in analog, digital or a combination thereof and the circuitry herein of processor 1510 is exemplary only. The speaker transforms the electronic signal into one that is audio. Now at T2 there is an audio signal that is very unique. Perhaps it is an explosion, or a gun-shot, or thunder. This unique signature is stored into a table 1516 along with an associated lighting effect. In a real time fashion the audio signal is digitized 1512 and presented to a comparator circuit 1514. Here it is compared to the pre-stored signatures 1516 and continuously looking for matches. Note, that there are no pre-programmed illumination identifiers but rather signature matching of pre-existing audio is used. During the period of T2 to T3, there is a match sensed by the comparator 1514. This causes line 1518 to go active. This in turn, triggers the associated illumination effect from the Sound Signature Response Table 1520 to be presented to the light 1524.

Finally, during the period between T3 and T4 (1506) the audio signal does not contain any matching light signatures and therefore only audio is presented to the viewer.

Exemplary Illumination Identifiers on Film Track

Figure 16:
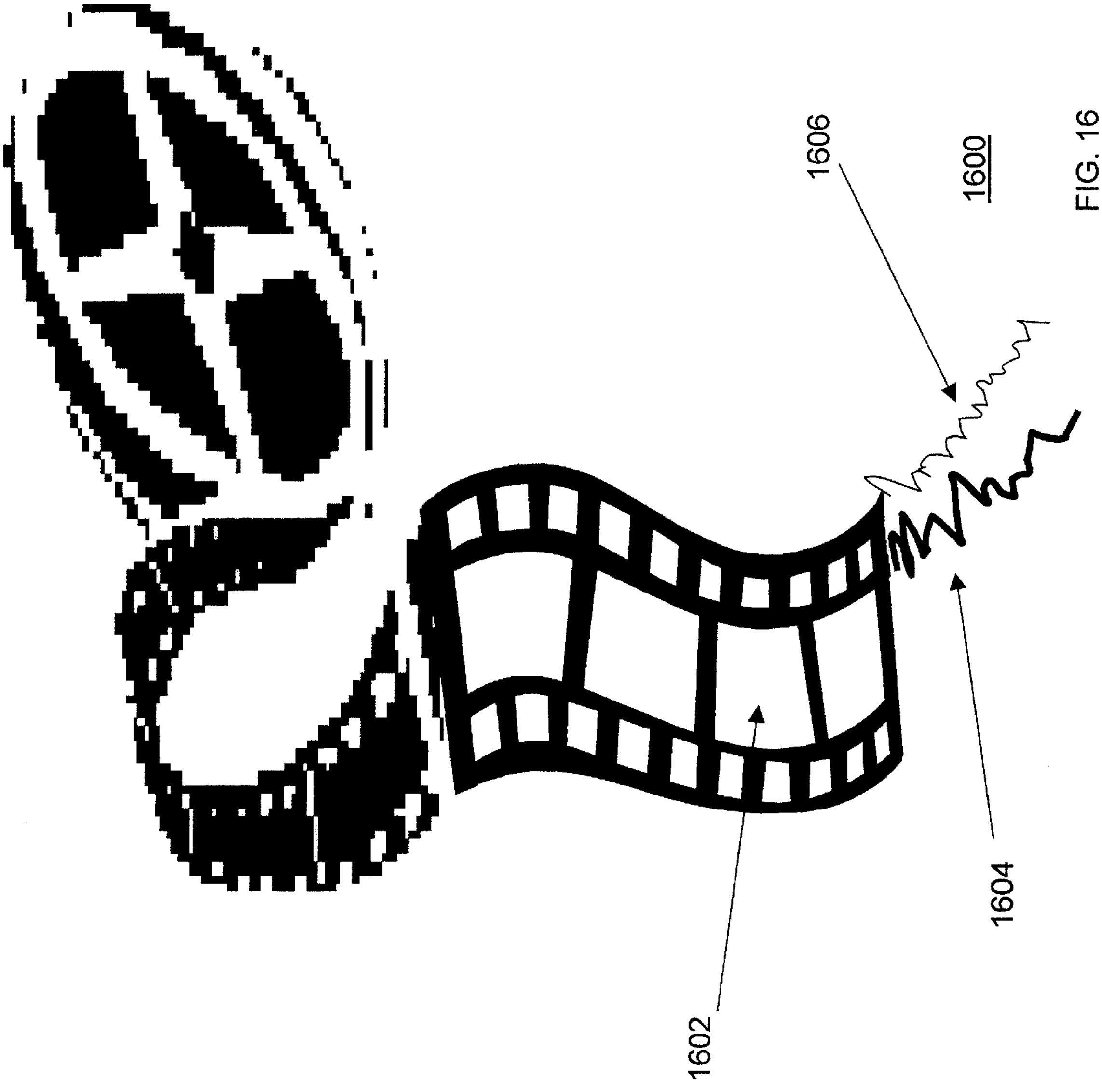
FIG. 16 is a perspective view of a film with illumination identifiers stored on film tracks, according to the present invention.

FIG. 16 is a perspective view 1600 of a film with illumination identifiers stored on film track 1606 according to the present invention. The film, such as 70 mm film, has a video area 1602, and a sound track area 1604. In addition, illumination identifiers in a track 1606 are added during the production of the film for additional effects. In one embodiment, the illumination identifiers are a MIDI sequence as described above. And although the illumination identifiers in the tracks are shown as part of a film track, it is important to note that the track of illumination identifiers could be part of a track in a DVD, Laserdisc, Video Cassette or other media such as the Internet were a primary multimedia presentation is being delivered, such as a movie.

Example of Method of Calculatinq Delay Between Site and Sound Perception

Figure 17:
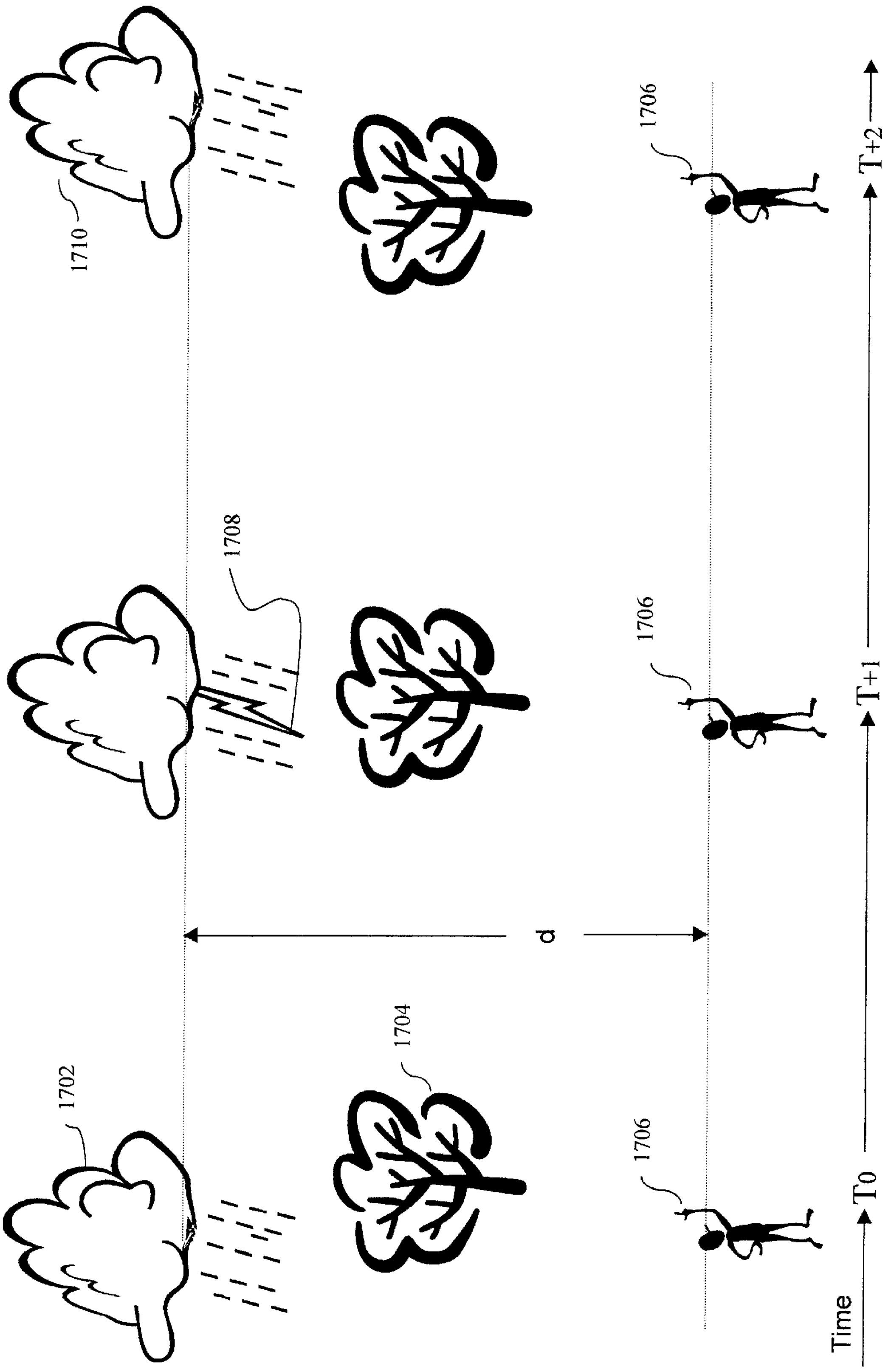
FIG. 17 is a diagram illustrating the calculation of the lag period between a viewer's sight and sound perception, according to the present invention.

FIG. 17 is a diagram illustrating the calculation of the delay period between a viewer's sight and sound perception, according to the present invention. On the left is a storm cloud 1702 raining on to a tree 1704 and at a distance "d" to a viewer in the foreground 1706. The distance "d" from the viewer 1706 to the tree 1704 is about one Kilometer (1,000 meters). The time is labeled as T0. As time progresses from TO to T+1, in the center of the figure, the storm cloud 1702 produces a lightning bolt 1708 to strike the tree 1704. The viewer 1706 can see the lightning bolt 1708 "instantly". As the speed of light is 2999,792,458 meters per second the time for the light to travel to the viewer is less than a second (1,000 meters/299,792,458 meters per second=3 microseconds). Finally on the right, time is now T+2. The storm cloud 1702 has continued past the tree 1704. The viewer 1706 hears the sound of the lightning bolt 1708. The speed of sound is 332 meters per second. Accordingly the viewer 1706 at T+2 hears the thunderbolt about 3 seconds after the lighting flash (1,000 meters/332 meters per second=3 seconds) the distance "d" from the tree to the viewer is one Kilometer. Stated differently, there is a 3 second delay between the flash of lightning bolt 1708 and the sound of thunder (not illustrated) at 1 Km form the source of the viewer 1706.

The sequence described in FIG. 17 of the delay between the flash of the lightning bolt 1708 and the thunder is many times lost when viewing this sequence in a television program of a movie. Using the illumination sources of the present invention, the producers of multimedia presentation can set a delay for a period of time between a flash (e.g. lightning) and the sound (e.g. thunder) is heard by a viewer. The delay in the authoring of the illumination identifiers is set to correspond to a distance the average viewer would be viewing the multimedia presentation in which the sequence occurs prior to a sound. Exemplary scenes for flashes preceding a sound are explosions, a lighting flash, a gunshot, and a rocket launch.

Examiles of Illumination Scenarios

The following scenarios are included to provide examples of how the present invention may be used to enhance the viewer's experience of watching a primary multimedia source such as a game, television, and a movie. These viewer's experience are described using one or more of the illumination sources described above. It is important to note that in all the following scenarios, the viewers are viewing a primary multimedia presentation and the illumination sources are placed in the periphery of the primary multimedia presentation so as to be positioned outside the direct view of the viewer.

Campfire scenario—In a movie or computer game environment, the viewer is presented a dark night scene with the only light coming from the glow of a campfire. The ceiling and walls of the viewer's environment have a soft flickering red and orange glow.

Gunfire scenario—In a movie or computer game a darkened room has a flash from gunfire, in the scene there is a flash that lights up one side of the setting and the people. The flash that lights up the scene happens slightly out of the field of view.

Explosion Scenario—In a movie or computer game an explosion happens, causing a "blinding" flash of light. The flash of an explosion should not only happen from the screen, but in fact totally surround the viewer.

Night blindness scenario—In a PC game a SWAT team is going from darkened room to darkened room looking of hostages. In one of the rooms the lights are turned on for a brief time and then off. For this scenario the darkened room has all of the lights turned on fully and game screen goes from very dark to very bright. This causes the SWAT team member (which is the game player) to have temporary night blindness. That is, unless the gamier has the discipline to close one eye that does not under go the temporary blindness once the lights are turned back off.

Lightning Scenario—A lightning storm is approaching. As the storm approaches there is a soft flash from behind then after some seconds the soft rumble of thunder. The flash to the thunder is timed so as to indicate distance. After some time there is a brighter flash from behind and a louder rumble of thunder, that happens very shortly after the flash, as determined by the delay time calculated above. Finally with the storm "upon the viewer" a simultaneous flash of lighting, from all around the viewer and a very loud bang of thunder happens, which is accomplished with the illumination sources placed near the surround sound sources in the theater, television, PC and game environments described above.

A Spinning Scenario—In a movie or computer game an airplane (for example) is in a tight horizontal turn. As the viewer is looking forward the screen illustrates the horizon spinning with the sun going by once each turn. In addition the surrounding lighting effect are controlled so as to give the viewer the illusion that the sun is leaving the screen, going to the right, then behind then to the left and finally reentering the screen.

Although a specific embodiment of the invention has been disclosed. It will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for auxiliary lighting to enhance a scene during a multimedia presentation, comprising the steps of:

coupling one or more illumination sources over a network, so that at least one illumination source of the one or more illumination sources is capable of being uniquely addressed;

displaying a multimedia presentation;

reading a series of preprogrammed illumination identifiers stored in computer readable medium corresponding with the multimedia presentation;

interpreting one or more illumination identifiers to create a set signal for one or more illumination sources including a period of time and with an address of at least one of the one or more illumination sources; and sending the set signal to one or more illumination sources over the network.

2. The method according to claim 1, wherein the step of displaying a multimedia presentation includes displaying a primary multimedia presentation in a direct view of at least one user; and further comprising the step of:

placing the one or more illumination sources in the periphery of the primary multimedia presentation so as to be positioned outside the direct view of the at least one user.

3. The method according to claim 1, wherein the step of interpreting one or more illumination identifiers includes interpreting one or more illumination identifiers to create a set signal with an intensity for the one or more illumination sources.

4. The method according to claim 3, wherein the step of interpreting one or more illumination identifiers includes interpreting one or more illumination identifiers to create a set signal with an intensity for the one or more illumination sources with a luminance value greater than a normal luminance value from the multimedia presentation.

5. The method according to claim 1, wherein the step of interpreting one or more illumination identifiers includes interpreting one or more illumination identifiers to create a set signal with an illumination color for the one or more illumination sources.

6. The method according to claim 1, wherein the step of interpreting one or more illumination identifiers includes interpreting one or more illumination identifiers to create a set signal for one or more illumination sources to flash for a period of time prior to an occurrence of an attendant action being presented on the multimedia presentation, wherein the attendant action is selected from the group of actions consisting of an explosion, a lightning flash, a gun shot, and a rocket launch.

7. The method according to claim 6, wherein the step of interpreting one or more illumination identifiers includes interpreting one or more illumination identifiers to create a set signal for one or more illumination sources to flash for a period of time prior to an occurrence of an attendant action being presented on the multimedia presentation, so that a time period between a setting of one or more illumination sources is set for a period time prior to the display of the attendant action to correspond to a difference in time one or more viewers of the multimedia presentation would typically perceive, at a predetermined distance, a difference in speed of travel of a flash of light in free space and a speed of sound in free space.

8. The method according to claim 1, wherein the step of coupling one or more illumination sources over a network, includes coupling one or more illumination sources over one of a group of addressable network buses selected from the group of buses consisting of X-10 bus, CE Bus, MIDI bus, RS422 bus, BitBus™, Universal Serial Bus, parallel bus, serial bus, Ethernet, and IEEE 488.

9. The method according to claim 1, wherein the step of displaying a multimedia presentation includes displaying a multimedia presentation selected from the group of multimedia presentations consisting of a movie, a television program, a game, and an electronic book.

10. The method according to claim 1, wherein the step of coupling one or more illumination sources over a network, so that at least one illumination source of the one or more illumination sources is capable of being uniquely addressed includes coupling one or more illumination sources over a network from a hand-held data processing unit having a display and at least one illumination source attached thereto, and which is visually perceivable when illuminated by the user while viewing the display; and wherein the step of displaying a multimedia presentation includes displaying a multimedia presentation on the display on the hand-held data processing unit.

11. The method according to claim 1, wherein the step of reading a series of preprogrammed illumination identifiers includes reading a series of illumination identifiers stored in computer readable selected from the group of computer readable medium consisting of magnetic media, optical media, and broadcast media.

12. A method for auxiliary lighting to enhancing a scene during a primary multimedia presentation to at least one user, comprising the steps of:

coupling one or more illumination sources over a network, so that at least one illumination source of the one or more illumination sources is capable of being uniquely addressed;

displaying a primary multimedia presentation in a direct view of at least one user;

placing the one or more illumination sources in the periphery of the primary multimedia presentation so as to be positioned outside the direct view of the at least one user;

monitoring the audio stream presented with the displaying of the primary multimedia presentation for one or more predefined audio signals;

interpreting one or more predefined audio signals to set one or more illumination sources for a period of time set and to set the address of at least one of the one or more illumination sources; and sending a set signal in response to the interpretation of the one more audio signals to one or more illumination sources over the network.

13. The method according to claim 12, wherein the step of displaying a primary multimedia presentation includes displaying a primary multimedia presentation in a direct view of at least one user; and further comprising the step of:

placing the one or more illumination sources in the periphery of the primary multimedia presentation so as to be positioned outside the direct view of the at least one user.

14. The method according to claim 12, wherein the step of interpreting one or more predefined audio signals includes interpreting one or more predefined audio signals to set an intensity of the one or more illumination sources.

15. The method according to claim 14, wherein the step of interpreting one or more predefined audio signals includes interpreting one or more predefined audio signals to set an intensity of the one or more illumination sources with a luminance value greater than a normal luminance value from the primary multimedia presentation.

16. The method according to claim 12, wherein the step of interpreting one or more predefined audio signals includes interpreting one or more predefined audio signals to set an illumination color of one or more illumination sources.

17. A method for auxiliary lighting to enhance a scene during a multimedia presentation in a head mounted unit, comprising the steps of:

coupling one or more illumination sources over a network, so that at least one illumination source of the one or more illumination sources is capable of being uniquely addressed;

displaying a multimedia presentation to a user wearing a head mounted unit, so that the primary multimedia presentation is directly viewable to the user;

placing at least one of the one or more illumination sources in a head mounted unit in a positioned outside a direct view the user, so that when the illumination source is illuminated the user of the head mounted unit is able to visually perceive the illumination of the at least one or more illumination sources while viewing the primary multimedia presentation;

placing the one or more illumination sources in a periphery of the primary multimedia presentation so as to be positioned outside the direct view of the at least one user;

reading a series of preprogrammed illumination identifiers stored in a computer readable medium corresponding with the primary multimedia presentation;

interpreting one or more illumination identifiers to set the one or more illumination sources for a period of time and to set an address of the at least one of the one or more illumination sources; and sending a set signal in response to the interpretation of the one more illumination identifiers to the one or more illumination sources over the network.

18. The method according to claim 17, wherein the step of displaying a multimedia presentation to a user wearing a head mounted unit, includes displaying a multimedia presentation projected from upon the head mounted unit.

19. The method according to claim 17, wherein the step of displaying a multimedia presentation to a user wearing the head mounted unit, includes displaying a multimedia presentation projected from within a head mounted unit that does not permit a light source outside the head mounted unit to be visually perceived by the user wearing the head mounted display.

20. The method according to claim 17, wherein the step of displaying a multimedia presentation includes displaying a multimedia presentation in a direct view of at least one user; and further comprising the step of:

placing the one or more illumination sources in the periphery of the primary multimedia presentation so as to be positioned outside the direct view of the at least one user.

21. The method according to claim 17, wherein the step of interpreting one or more illumination identifiers includes interpreting one or more illumination identifiers to set an intensity of the one or more illumination sources.

22. The method according to claim 21, wherein the step of interpreting one or more illumination identifiers includes interpreting one or more illumination identifiers to set an intensity of the one or more illumination sources with a luminance value greater than a normal luminance value from the primary multimedia presentation.

23. The method according to claim 17, wherein the step of interpreting one or more illumination identifiers includes interpreting one or more illumination identifiers to set an illumination color of one or more illumination sources.

24. The method according to claim 17, wherein the step of interpreting one or more illumination identifiers includes interpreting one or more illumination identifiers to set one or more illumination sources to flash for a period of time prior to the occurrence of an attendant action being presented on the primary multimedia presentation, wherein the attendant action is selected from the group of actions consisting of an explosion, a lightning flash, a gun shot, and a rocket launch.

25. The method according to claim 24, wherein the step of interpreting one or more illumination identifiers includes interpreting one or more illumination identifiers to set one or more illumination sources to flash for a period of time prior to the occurrence of an attendant action being presented on the primary multimedia presentation, so that a time period between the setting of one or more illumination sources is set for a period time prior to the display of the attendant action, to correspond to the difference in time one or more viewers of the primary multimedia presentation would typically perceive, at a predetermined distance, a difference in speed of travel of a flash of light in free space and a speed of sound in free space.

26. A method for auxiliary lighting to enhance a scene during a multimedia presentation in a head mounted unit, comprising the steps of:

coupling one or more illumination sources over a network, so that at least one illumination source of the one or more illumination sources is capable of being uniquely addressed;

displaying a primary multimedia presentation to a user wearing a head mounted unit, so that the primary multimedia presentation is directly viewable to the user;

placing at least one of the one or more illumination sources in a head mounted unit in a positioned outside the direct view the user, so that when the illumination source is illuminated the user of the head mounted unit is able to visually perceive the illumination of the at least one or more illumination sources while viewing the primary multimedia presentation;

filtering the audio stream presented with the displaying of the primary multimedia presentation for one or more predefined audio signal levels;

interpreting one or more predefined audio signal levels to set one or more illumination sources for a period of time set and to set the address of at least one of the one or more illumination sources; and sending a set signal in response to the interpretation of the one more audio signal levels to one or more illumination sources over the network so that at least one of the audio signal levels illuminates the at least one of the one or more illumination sources in the head mounted unit.

27. The method according to claim 26, wherein the step of displaying a primary multimedia presentation to a user wearing a head mounted unit, includes displaying a primary multimedia presentation projected upon a head mounted unit.

28. The method according to claim 27, wherein the step of displaying a primary multimedia presentation to a user wearing a head mounted unit, includes displaying a primary multimedia presentation projected from within a head mounted display that does not permit a light source outside the head mounted display to be visually perceived by the user wearing the head mounted display.

29. The method according to claim 26, wherein the step of displaying a primary multimedia presentation includes displaying a primary multimedia presentation in a direct view of at least one user; and further comprising the step of:

placing the one or more illumination sources in the periphery of the primary multimedia presentation so as to be positioned outside the direct view of the at least one user.

30. The method according to claim 26, wherein the step of interpreting one or more predefined audio signals includes interpreting one or more predefined audio signals to set an intensity of the one or more illumination sources.

31. The method according to claim 30, wherein the step of interpreting one or more predefined audio signals identifiers includes interpreting one or more predefined audio signals to set an intensity of the one or more illumination sources with a luminance value greater than a normal luminance value from the primary multimedia presentation.

32. The method according to claim 26, wherein the step of interpreting one or more predefined audio signals includes interpreting one or more predefined audio signals to set an illumination color of one or more illumination sources.

33. A computer readable medium containing programming instructions for auxiliary lighting to enhance a scene during a multimedia presentation, comprising the programming instructions of:

coupling one or more illumination sources over a network, so that at least one illumination source of the one or more illumination sources is capable of being uniquely addressed;

displaying a multimedia presentation;

reading a series of preprogrammed illumination identifiers stored in computer readable medium corresponding with the primary multimedia presentation;

interpreting one or more illumination identifiers to create a set signal for with one or more illumination sources including a period of time and with an address of at least one of the one or more illumination sources; and sending the set signal to one or more illumination sources over the network.

34. The computer readable medium according to claim 33, wherein the programming instruction of displaying a multimedia presentation includes displaying a primary multimedia presentation in a direct view of at least one user; and further comprising the step of:

placing the one or more illumination sources in the periphery of the primary multimedia presentation so as to be positioned outside the direct view of the at least one user.

35. The computer readable medium according to claim 33, wherein the programming instruction of interpreting one or more illumination identifiers includes interpreting one or more illumination identifiers to create a set signal with an intensity of the one or more illumination sources.

36. The computer readable medium according to claim 35, wherein the programming instruction of interpreting one or more illumination identifiers to create set signal with an intensity for the one or more illumination sources with a luminance value greater than a normal luminance value from the primary multimedia presentation.

37. The computer readable medium according to claim 33, wherein the programming instruction of interpreting one or more illumination identifiers includes interpreting one or more illumination identifiers to create a set signal with an illumination color for the one or more illumination sources.

38. The computer readable medium according to claim 33, wherein the programming instruction of interpreting one or more illumination identifiers includes interpreting one or more illumination identifiers to create a set signal with one or more illumination sources to flash for a period of time prior to the occurrence of an attendant action being presented on the primary multimedia presentation, wherein the attendant action is selected from the group of actions consisting of an explosion, a lightning flash, a gun shot, and a rocket launch.

39. The computer readable medium according to claim 38, wherein the programming instruction of interpreting one or more illumination identifiers includes interpreting one or more illumination identifiers to create a set signal with one or more illumination sources to flash for a period of time prior to the occurrence of an attendant action being presented on the primary multimedia presentation, so that a time period between a setting of one or more illumination sources is set for a period time prior to the display of the attendant action, to correspond to a difference in time one or more viewers of the primary multimedia presentation would typically perceive, at a predetermined distance, a difference in speed of travel of a flash of light in free space and a speed of sound in free space.

40. The computer readable medium according to claim 33, wherein the programming instruction of coupling one or more illumination sources over a network, includes coupling one or more illumination sources over one of a group of addressable network buses selected from the group of buses consisting of X-10 bus, CE Bus, MIDI bus, RS422 bus, BitBus™, Universal Serial Bus, parallel bus, serial bus, Ethernet, and IEEE 488.

41. The computer readable medium according to claim 33, wherein the programming instruction of displaying a multimedia presentation includes displaying a multimedia presention selected from the group of multimedia presentations consisting of a movie, a television program, a game, and an electronic book.

42. The computer readable medium according to claim 33, further comprising the programming instruction of:

coupling one or more illumination sources over a network, so that at least one illumination source of the one or more illumination sources is capable of being uniquely addressed from a hand-held data processing unit having a display and at least one illumination source attached thereto, and which is visually perceivable when illuminated by the user while viewing the display; and wherein the step of displaying a multimedia presentation includes displaying a multimedia presentation on the display on the hand-held data processing unit.

43. The computer readable medium according to claim 33, wherein the programming instruction of reading a series of preprogrammed illumination identifiers includes reading a series of illumination identifiers stored in computer readable selected from the group of computer readable medium consisting of magnetic media, optical media, and broadcast media.

44. A computer readable medium containing programming instructions for auxiliary lighting to enhance a scene during a primary multimedia presentation, comprising the programming instructions of:

coupling one or more illumination sources over a network, so that at least one illumination source of the one or more illumination sources is capable of being uniquely addressed;

displaying a primary multimedia presentation in a direct view of at least one user;

placing the one or more illumination sources in the periphery of the primary multimedia presentation so as to be positioned outside the direct view of the at least one user;

filtering the audio stream presented with the displaying of the primary multimedia presentation for one or more predefined audio signal levels;

interpreting one or more predefined audio signal levels to set one or more illumination sources for a period of time set and to set the address of at least one of the one or more illumination sources; and sending a set signal in response to the interpretation of the one more audio signal levels to one or more illumination sources over the network.

45. The computer readable medium according to claim 44, wherein the programming instruction of displaying a multimedia presentation includes displaying a primary multimedia presentation in a direct view of at least one user; and further comprising the step of:

placing the one or more illumination sources in the periphery of the primary multimedia presentation so as to be positioned outside the direct view of the at least one user.

46. The computer readable medium according to claim 44, wherein the programming instruction of interpreting one or more predefined audio signals includes interpreting one or more predefined audio signals to set an intensity of the one or more illumination sources.

47. The computer readable medium according to claim 46, wherein the programming instruction of interpreting one or more predefined audio signals includes interpreting one or more predefined audio signals to set an intensity of the one or more illumination sources with a luminance value greater than a normal luminance value from the primary multimedia presentation.

48. The computer readable medium according to claim 44, wherein the step of interpreting one or more illumination identifiers includes interpreting one or more illumination identifiers to set an illumination color of one or more illumination sources.

49. A system for auxiliary lighting to enhance a scene during a multimedia presentation, comprising:

a network interface for coupling one or more illumination sources over a network, so that at least one illumination source of the one or more illumination sources is capable of being uniquely addressed;

a display interface displaying a multimedia presentation;

means for reading a series of preprogrammed illumination identifiers stored in computer readable medium corresponding with the primary multimedia presentation;

means for interpreting one or more illumination identifiers to set one or more illumination sources for a period of time and to set the address of at least one of the one or more illumination sources; and means for sending a set signal in response to the interpretation of the one more illumination identifiers to one or more illumination sources over the network.

50. The system according to claim 49, wherein the display interface includes an interface for a primary multimedia presentation in a direct view of at least one user; and further the means for placing the one or more illumination sources in the periphery of the primary multimedia presentation so as to be positioned outside the direct view of the at least one user.

51. A system for auxiliary lighting to enhancing a scene during a primary multimedia presentation to at least one user, comprising:

a bus interface for coupling one or more illumination sources over a network, so that at least one illumination source of the one or more illumination sources is capable of being uniquely addressed; a display interface for displaying a primary multimedia presentation in a direct view of at least one user;

means for placing the one or more illumination sources in the periphery of the primary multimedia presentation so as to be positioned outside the direct view of the at least one user;

a filter for filtering the audio stream presented with the displaying of the primary multimedia presentation for one or more predefined audio signal levels;

a comparator for comparing one or more predefined audio signal levels to set one or more illumination sources for a period of time set and to set the address of at least one of the one or more illumination sources; and an output for sending a set signal in response to the interpretation of the one more audio signal levels to one or more illumination sources over the network.

* * * * *

UNITED STATES PATENT AND TRADEMARK OFFICE

CERTIFICATE OF CORRECTION

PATENT NO. : 6,564,108 B1
DATED : May 13, 2003
INVENTOR(S) : Michael G. Makar et al.

It is certified that error appears in the above-identified patent and that said Letters Patent is hereby corrected as shown below:

Title page,
Item [57], ABSTRACT, please delete the last two paragraphs

Column 1,
Line 55, change "darken" to -- darkened --
Line 60, change "ration" to -- ratio --

Column 2,
Line 3, change "of gigantic dinosaur stomp" to -- of a gigantic dinosaur stomping --
Line 40, change "light through" to -- light entering through --
Line 41, change "often time" to -- often times --
Line 49, change "ration" to -- ratio --
Line 66, change "according" to -- accordingly --

Column 3,
Line 22, change "room windows" to -- room with windows --
Line 24, change "ration" to -- ration --

Column 4,
Line 29, change "need exists for" to -- need exists --

Column 8,
Line 44, change "such force" to -- such as force --

Column 9,
Line 6, change "over the to" to -- over the user's face to --
Line 61, change "wom" to -- worn --

Column 10,
Line 41, change "system, the" to -- system in the --

Column 11,
Line 28, change "At time" to -- At a time --
Line 40, change "At the time" to -- At the time --

Column 13,
Line 42, change "of hostages" to -- for hostages --
Line 48, change "gamier" to -- gamer --

UNITED STATES PATENT AND TRADEMARK OFFICE

CERTIFICATE OF CORRECTION

PATENT NO. : 6,564,108 B1
DATED : May 13, 2003
INVENTOR(S) : Michael G. Makar et al.

It is certified that error appears in the above-identified patent and that said Letters Patent is hereby corrected as shown below:

Column 16,
Line 32, change "positioned outside" to -- position outside --
Line 33, change "view the" to -- view of the --

Column 17,
Line 52, change "positioned outside" to -- position outside --
Line 53, change "view the" to -- view of the --

Signed and Sealed this

Seventh Day of October, 2003

JAMES E. ROGAN
*Director of the United States Patent and Trademark Office*